US009003850B2

(12) United States Patent
Hesselmann et al.

(10) Patent No.: US 9,003,850 B2
(45) Date of Patent: Apr. 14, 2015

(54) BOUNDARY LAYER IMPROVEMENT OF PLATE SPRINGS OR UNDULATING SPRINGS

(75) Inventors: Bernfried Hesselmann, Wenden (DE); Sven Roth, Weitefeld (DE); Peter Buchner, Neunkhausen (DE); Andreas Rinsdorf, Freudenberg (DE); Thomas Muhr, Attendorn (DE)

(73) Assignee: Muhr und Bender KG, Attendorn (DE)

( * ) Notice: Subject to any disclaimer, the term of this patent is extended or adjusted under 35 U.S.C. 154(b) by 413 days.

(21) Appl. No.: 11/821,450

(22) Filed: Jun. 22, 2007

(65) Prior Publication Data
US 2008/0006351 A1    Jan. 10, 2008

(30) Foreign Application Priority Data

Jun. 23, 2006  (DE) .......................... 10 2006 029 316
Oct. 30, 2006  (DE) .......................... 10 2006 051 683

(51) Int. Cl.
C21D 7/06        (2006.01)
F16F 1/32        (2006.01)
B23P 9/02        (2006.01)
B24C 1/10        (2006.01)
C21D 1/78        (2006.01)
C21D 9/02        (2006.01)

(52) U.S. Cl.
CPC ... F16F 1/32 (2013.01); B23P 9/02 (2013.01); B24C 1/10 (2013.01); C21D 1/78 (2013.01); C21D 7/06 (2013.01); C21D 9/02 (2013.01); F16F 2226/02 (2013.01)

(58) Field of Classification Search
CPC .................................... C21D 7/06; C21D 7/04
USPC ......... 72/53, 75, 67, 112, 214, 220, 199, 206; 29/90.7
See application file for complete search history.

(56) References Cited

U.S. PATENT DOCUMENTS

| 1,947,927 | A | * | 2/1934 | Vorwerk ...................... 29/90.01 |
| 2,608,752 | A | * | 9/1952 | Schilling .................... 29/896.91 |
| 3,004,584 | A | * | 10/1961 | Fuchs et al. ....................... 72/53 |
| 3,131,457 | A | * | 5/1964 | Correll et al. ..................... 72/53 |
| 3,313,552 | A | * | 4/1967 | Farr et al. ...................... 277/384 |
| 3,345,727 | A | * | 10/1967 | Komarnitsky ................ 148/580 |
| 3,438,229 | A | * | 4/1969 | Bartlett ............................ 72/53 |
| 3,977,504 | A |   | 8/1976 | Kajitani |

(Continued)

FOREIGN PATENT DOCUMENTS

| DE | 850620 C | 9/1952 |
| DE | 1263056 B | 3/1968 |

(Continued)

OTHER PUBLICATIONS

Brochure, Ecoroll, Germany.

(Continued)

*Primary Examiner* — Edward Tolan
(74) *Attorney, Agent, or Firm* — MacMillan, Sobanski & Todd, LLC

(57) ABSTRACT

A process for producing plate springs or undulating springs wherein surface regions which are subjected to tensile stresses when the spring is under load are provided with an internal compressive stress in the boundary layer, wherein said surface regions are rollingly compressed by a ball or roller or subjected to tensile stress and compressed by shot peening.

7 Claims, 29 Drawing Sheets

(56) References Cited

U.S. PATENT DOCUMENTS

| | | | | |
|---|---|---|---|---|
| 4,034,585 | A | * | 7/1977 | Straub .................. 72/53 |
| 4,135,283 | A | * | 1/1979 | Kohlhage ................ 148/580 |
| 4,337,632 | A | * | 7/1982 | Lienert .................. 72/53 |
| 4,453,392 | A | * | 6/1984 | Klubovich et al. .......... 72/75 |
| 4,974,434 | A | * | 12/1990 | Reccius et al. ............ 72/53 |
| 5,072,606 | A | * | 12/1991 | Koehler et al. ............ 72/53 |
| 5,481,457 | A | | 1/1996 | Yamamoto et al. |
| 5,492,576 | A | * | 2/1996 | Jehl et al. ................ 148/580 |
| 5,631,833 | A | | 5/1997 | Wada et al. |
| 5,788,010 | A | | 8/1998 | Mukai et al. |
| 5,816,088 | A | * | 10/1998 | Yamada et al. ............ 72/53 |
| 5,868,022 | A | * | 2/1999 | Mizukami ................ 72/53 |
| 6,022,427 | A | * | 2/2000 | Wienand et al. .......... 148/580 |
| 6,152,255 | A | | 11/2000 | Noro et al. |
| 6,282,472 | B1 | | 8/2001 | Jones et al. |
| 6,415,486 | B1 | * | 7/2002 | Prevey, III .............. 29/90.01 |
| 6,544,360 | B1 | * | 4/2003 | Tange et al. ............ 148/580 |
| 6,651,474 | B2 | | 11/2003 | Heimann |
| 6,790,294 | B1 | * | 9/2004 | Ishida et al. ............ 148/212 |
| 7,192,015 | B2 | * | 3/2007 | Muhr et al. ............ 267/164 |
| 7,284,308 | B2 | * | 10/2007 | Akeda et al. ............ 29/90.7 |
| 7,686,148 | B2 | * | 3/2010 | Yetzke .................. 192/83 |
| 2004/0016278 | A1 | * | 1/2004 | Douman et al. .......... 72/53 |
| 2005/0029721 | A1 | | 2/2005 | Muhr et al. |
| 2005/0150711 | A1 | | 7/2005 | Burton et al. |
| 2005/0155203 | A1 | | 7/2005 | Prevey |
| 2005/0247385 | A1 | | 11/2005 | Krafsur et al. |
| 2007/0228625 | A1 | | 10/2007 | Kriese et al. |
| 2010/0125390 | A1 | | 5/2010 | Fernandez et al. |
| 2010/0228443 | A1 | | 9/2010 | Junghanns |
| 2010/0268418 | A1 | | 10/2010 | Fernandez et al. |
| 2011/0010054 | A1 | | 1/2011 | Wilson-Jones et al. |

FOREIGN PATENT DOCUMENTS

| | | | | |
|---|---|---|---|---|
| DE | 2543693 | A1 | 4/1976 | |
| DE | 3142270 | A1 | 5/1983 | |
| DE | 4444649 | A1 | 6/1995 | |
| DE | 4447330 | A1 | 7/1996 | |
| DE | 19740290 | A1 | 10/1998 | |
| EP | 0965399 | | 12/1999 | |
| EP | 0965399 | A2 | 12/1999 | |
| EP | 1316494 | A1 | 6/2003 | |
| EP | 1503102 | | 2/2005 | |
| EP | 1839919 | | 10/2007 | |
| GB | 1528598 | A | 10/1978 | |
| JP | 64-78763 | * | 3/1989 | .......... B24C 1/10 |
| JP | 5-148537 | * | 6/1993 | .......... C21D 7/06 |
| JP | 2000027915 | A | 1/2000 | |
| JP | 2002526271 | A | 8/2002 | |
| JP | 2004144132 | A | 5/2004 | |
| JP | 2008-304014 | A | * 12/2008 | .......... C21D 7/06 |
| WO | 0020710 | A1 | 4/2000 | |
| WO | WO 00/20710 | | 4/2000 | |
| WO | 0164398 | A2 | 9/2001 | |
| WO | WO 01/64398 | | 9/2001 | |

OTHER PUBLICATIONS

Book, "Metallfedern Grundlagen, Werkstoff, Berechnung, Gestaltung and Rechnereinsatz, 2 Auflage 2007, erste Auflage bereits 1996".

"Shot peening", Prof. Wagner, 2003.

"Evolution of the Residual Stresses by Stress Rolling", Eckehard Muller, pp. 436-441 (2005).

International Search Report, Application No. PCT/GB2011/050091, Dated Apr. 27, 2011.

Search Report Under Section 17(5), Intellectual Property Office, Application No. GB1000948.8, Dated May 12, 2010.

German Search Report for Application No. 10 2006 029 316.9 dated Jul. 19, 2006.

European Patent Office Notice for Application No. 07011922.7 dated Feb. 18, 2008.

European Communication of Statement of Opposition for Application No. 07011922.7 dated May 4, 2010.

"Werkzeugtechnologie fur die Oberflachenveredelung—Glattwalzen, Festwalzen, Zylinderohrbearbeitung", Ecoroll Corporation Tool Technology, www.ecoroll.de, 2006.

"Modern Mechanical Surface Treatment—States, Stability, Effects", Volker Schulze, Wiley-VCH, Nov. 2005.

9th International Conference and Exhibition on Shot Peening, Sep. 6-9, 2005, Paris, Marne la Vallee, France, Organiser: Institute for Industrial Technology Transfer, www.iitt.com.

\* cited by examiner

BOUNDARY LAYER IMPROVEMENT OF PLATE SPRINGS OR UNDULATING SPRINGS

FIELD OF THE INVENTION

The invention relates to a process of producing plate springs or undulating springs where surface regions which are subjected to tensile stresses when the spring is under load are provided with an internal compressive stress in the boundary layer. The invention also relates to plate springs or undulating springs where surface regions which are subjected to tensile stresses when the spring is under load are provided with an internal compressive stress in the boundary layer.

The term "boundary layer" in this context refers to a depth region which starts from the surface and at which, at the finished component, there has been generated an internal compressive stress. An internal compressive stress in the boundary layer prevents the formation of stress and crack propagation from the surface, which leads to an increase in the fatigue strength of the component.

Said plate springs or undulating springs comprise a closed annular shape and a largely uniform material thickness.

While featuring an extremely short overall length, plate springs commonly comprise a degressive characteristic curve. Even with a short spring travel, they provide high spring forces. Plate springs are frequently used as spring columns with corresponding or changing conical positions, but also as individual elements. They can be slotted or toothed at their inner edges and/or outer edges.

Undulating springs are usually spring elements which are undulating relative to a plane, or spring elements which are undulating relative to a conical face and which comprise linear or progressive characteristic curves. They are frequently used as damping springs in multi-plate couplings of automatic gearboxes.

When in use, both types of springs are also subjected to static, but mostly to dynamic loads.

In the case of springs with a smaller thickness, plate springs and undulating springs are produced by punching out spring blanks from a cold-rolled flat strip. This is effected either by standard punching or by precision cutting, the latter option being chosen to achieve a better quality of the cut edge. After the spring blanks have been punched out, the burr occurring in standard punching or precision cutting operations is removed by friction grinding.

Thereafter, forming takes place by hot or cold forming. To achieve the required spring characteristics, the spring blanks are subsequently quenched and tempered. Shot peening after the quenching and tempering operation can generate an internal compressive stress in the boundary layer, as a result of which the service life of the plate springs and undulating springs for a dynamic load can be improved.

When the plate springs or undulating springs are subjected to loads, the internal compressive stress is reduced or eliminated by tensile stresses acting in the circumferential direction of the spring ring.

There are numerous applications for plate springs and undulating springs in engineering and plant construction. A further application is in multi-plate couplings in automatic gearboxes.

As a result of high tensile stresses under load conditions, it is frequently not possible when there prevail high forces and limited installation spaces, to meet all the requirements regarding the service life of plate springs and undulating springs in respect of static or dynamic loads. This is also the case if, by a shot peening process, a high internal compressive stress was generated in the boundary layer of the surface layers of the stress-relieved plate spring subjected more particularly to tensile stresses.

It is therefore frequently necessary to use plate springs and undulating springs in multiple arrangements to keep the loads on the individual plate springs and undulating springs low in order to achieve the required number of load cycles in operation.

This leads to an increased number of plate springs or undulating springs and, overall, a larger installation space. The increased number of plate springs or undulating springs results in higher costs, and, at the same time, the larger installation space required results in higher unit costs.

DE 103 34 470 A1 describes plate springs wherein the surface regions subjected to tensile stresses are provided by shot peening or heat treatment with an increased internal compressive stress in the boundary region.

From DE 44 44 649 A1, there are known plate springs which are punched out of a strip material, which are subsequently hardened and erected, then tempered and shot-peened, with a so-called settlement process taking plate thereafter. As far as shot peening is concerned, it is proposed to select different peening parameters for the upper side and lower side of the spring in order to specifically influence the force/travel characteristics of the plate spring.

OBJECT OF THE INVENTION

It is an object of the present invention to propose a process of producing plate springs and undulating springs by means of which the static and dynamic load bearing capacity of the respective products can be increased significantly, and, respectively, to provide plate springs and undulating springs which comprise a correspondingly increased load bearing capacity.

An objective is achieved by providing a process of producing plate springs or undulating springs wherein surface regions which are subjected to tensile stresses when the spring is under load are provided with an internal compressive stress in the boundary layer, wherein said surface layers are rollingly compressed by a ball or a roller. More particularly, it is proposed that said surface regions are rollingly compressed in circular movements of the ball or roller around the axis of the spring relative to the spring. According to a particularly advantageous process it is proposed that said surface regions are rollingly compressed while tensile stresses are generated in said surface regions.

In addition, one objective is achieved by a process of producing plate springs or undulating springs wherein surface regions which are subjected to tensile stresses when the spring is under load are provided with an internal compressive stress in the boundary layer, wherein said surface regions are compressed while the elastically deformed spring is subjected to tensile stress and treated by shot peening.

As far as the term "compressing" is concerned, this is to describe clearly the remaining changes in the stress conditions. It is correct, however, that, with the processes mentioned, an elastic and, optionally plastic deformation takes place while the volume of the material remains constant.

On the one hand, the processes described here build up higher internal compressive stresses than previous shot peening processes; on the other hand, the processes listed here make it possible to displace the maximum of the internal compressive stress into deeper regions of the boundary layer, thus achieving a boundary layer quality which, even in the case of any inclusions or defective areas in the material, lead to increased service life values of the springs under elastic and dynamic loads.

More particularly, it is proposed that said surface regions are rollingly compressed or compressed by shot peening, with the spring being at least elastically deformable, more particularly with a spring which is pressed flat. However, it is also possible to carry out a type of deformation which deviates from pressing the spring into a flat, planar position, which is less pronounced or which, in the case of the plate spring, is more pronounced and goes beyond the planar position, or merely a local deformation in the region of compression. The temporary deformation during compression can also extend beyond the yield point, so that said surface regions are plastically deformed.

With this type of process it is possible both to significantly increase the maximum values of the internal compressive stress in the boundary layer and the depth position of the respective maximum of the internal compressive stress in the boundary layer, as will be explained later in greater detail.

Apart from achieving an improvement in the values for the internal compressive stress, it is particularly advantageous to be able, simultaneously, to smooth the treated surface regions, which reduces the risk of crack formation, starting from the surfaces.

To the extent that surfaces treated by strength rolling, respectively strength forming (compression rolling, compression forming) are not limited to partial regions of the surfaces, it is advantageous to compress the remaining regions by the prior art shot peening process. According to a preferred method, surface compression takes place after shot peening, so that the above-described smoothing effect as a result of rolling compression is maintained in the treated regions of the plate springs or undulating springs is maintained.

To the extent that compression by shot peening in the case of a flat-pressed spring is limited to partial surface regions, it is advantageous to compress the remaining regions by shot peening, with the spring being in a stress-relieved condition. In a preferred way, surface compression of the entire surface takes place on a stress-relieved spring.

Rolling compression and/or compression by shot peening, in an advantageous way, takes place after quenching and tempering of the spring, so that the results of strength rolling and/or shot peening cannot be partially adversely affected by the subsequent heat treatment.

According to an advantageous process, rolling compression takes place at an increased temperature of the spring in excess of 180° C., more particularly at approximately 200° C., and compression by shot peening of the deformed spring at an increased temperature of the spring in excess of 150° C. to approximately 250° C., more particularly at approx. 200° C. In this way it is possible to displace the maximum of the internal compressive stress into greater depths below the surface.

Furthermore, the invention relates to plate springs or undulating springs wherein surface regions which are subjected to tensile stresses when the spring is under load are provided with an internal compressive stress in the boundary layer, wherein the maximum of the internal compressive stress in the boundary layer of rollingly compressed surface regions amounts to at least 850 MPa wherein the plate spring or the undulating spring is produced more particularly in accordance with the above-mentioned process. According to a preferred embodiment it is proposed that the internal compressive stress in the boundary layer of said surface regions in a depth of 200 μm amounts to at least 500 Mpa.

Furthermore, the invention relates to plate springs or undulating springs wherein surface regions which are subjected to tensile stresses when under load are subjected to an internal compressive stress in the boundary layer, wherein the maximum of the internal compressive stress in the boundary layer of surface regions treated by shot peening with the spring being in the deformed condition amounts to at least 850 Mpa. According to a preferred embodiment, it is proposed that the internal compressive stress in the boundary layer regions compressed by shot peening with the spring being in the deformed condition in a depth of 100 μm amounts to at least 750 Mpa.

Starting from the fact known in itself that the improvement in quality due to an internal compressive stress must cover more particularly those surface regions which, under load, are subjected to tensile stresses in the boundary layer, it is proposed more particularly that at least one of the inner and outer annular edges is provided with an internal compressive stress in the boundary layer or that, in the case of a plate spring, at least one boundary region of the internally conical underside is provided with an internal compressive stress in the boundary layer and that, on the case of an undulating spring, at least one boundary region of the undulating upper and lower surfaces is provided with an internal compressive stress in the boundary layer. The plate springs can be designed in such a way that the plate spring, at its inner edge, is slotted or toothed and/or that the plate spring, at its outer edge, is slotted or toothed. As far as undulating springs are concerned, the undulation can be superimposed by conicity. In addition, undulation around the circumference can vary in such a way that the minima and maxima are present in different magnitudes and at different levels in a periodic sequence.

BRIEF DESCRIPTION OF THE DRAWINGS

Preferred embodiments of the invention are illustrated in the drawings and will be described below.

DETAILED DESCRIPTION

Figure 1:
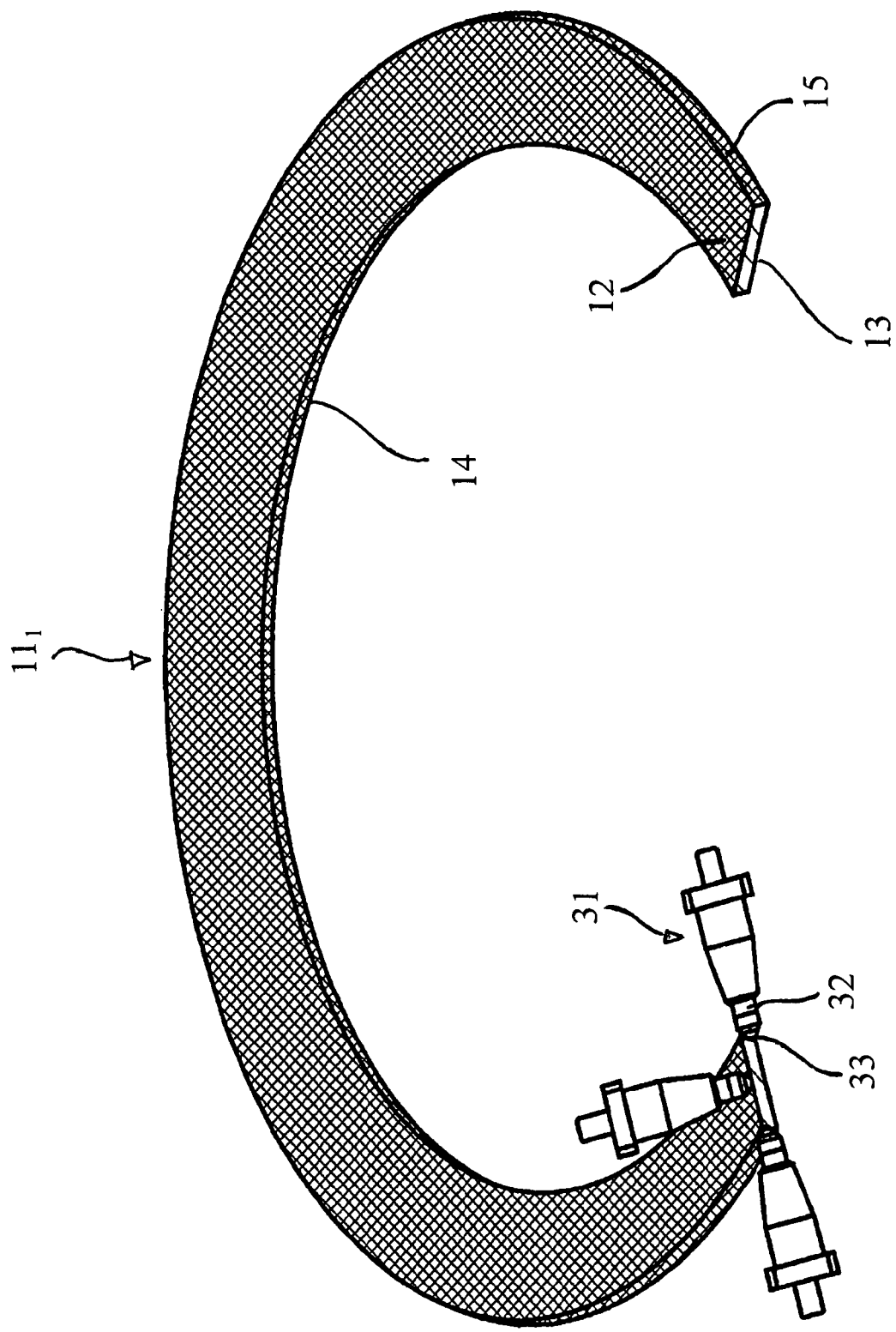
FIG. 1 illustrates a first embodiment of an inventive plate spring of a first type while being rollingly compressed.

FIGS. 1 to 5 will be described jointly below. Each shows a plate spring $11_1$ in a 3D illustration in which a front partial region has been cut away. The plate spring constitutes a complete annulus. A cone shape is provided such that the point of the opening cone of the parallel upper side and lower side is positioned underneath the spring ring. The side positioned on top is referred to as the underside 12 and the side positioned at the bottom is referred to as the upper side 13. There is also differentiated between an inner annular edge 14 and an outer annular edge 15. In a cross-sectional view the plate spring $11_1$ is rectangular, i.e. it consists of sheet metal of a substantially uniform thickness. The surface regions subjected to a rolling compression are shown in grey. FIGS. 1 to 5 each show a rolling tool 31 in different positions, with the different positions symbolising the rolling compression of different surface regions. The tool 31 is clamped into a tool holding device (not shown) which, while numerically controlled, can be moved more particularly around three axes. The tool 31 comprises a ball holding device which is hydrostatically supported and displaceable relative to the tool 31. At its front end, the ball holding device 32 carries a freely rotatable ball 33 consisting of hard ceramics for example. By means not illustrated, the plate spring $11_1$ can be clamped on and rotatingly driven around its axis, with the tool 31 being moved forwards across the surfaces of the plate spring. In the process, there is generated a contact pressure of the ball 33, which contact pressure plastically deforms the surfaces and, at the same time, generates an internal compressive stress in the boundary layer. The surfaces subjected to strength rolling are shown in a dark shade in the Figures, and for clarification purposes, the tool 31 is shown in a position on the treated surfaces.

FIG. 1, in this way, shows the underside 12, the inner annular edge 14 and the outer annular edge being rollingly compressed.

Figure 2:
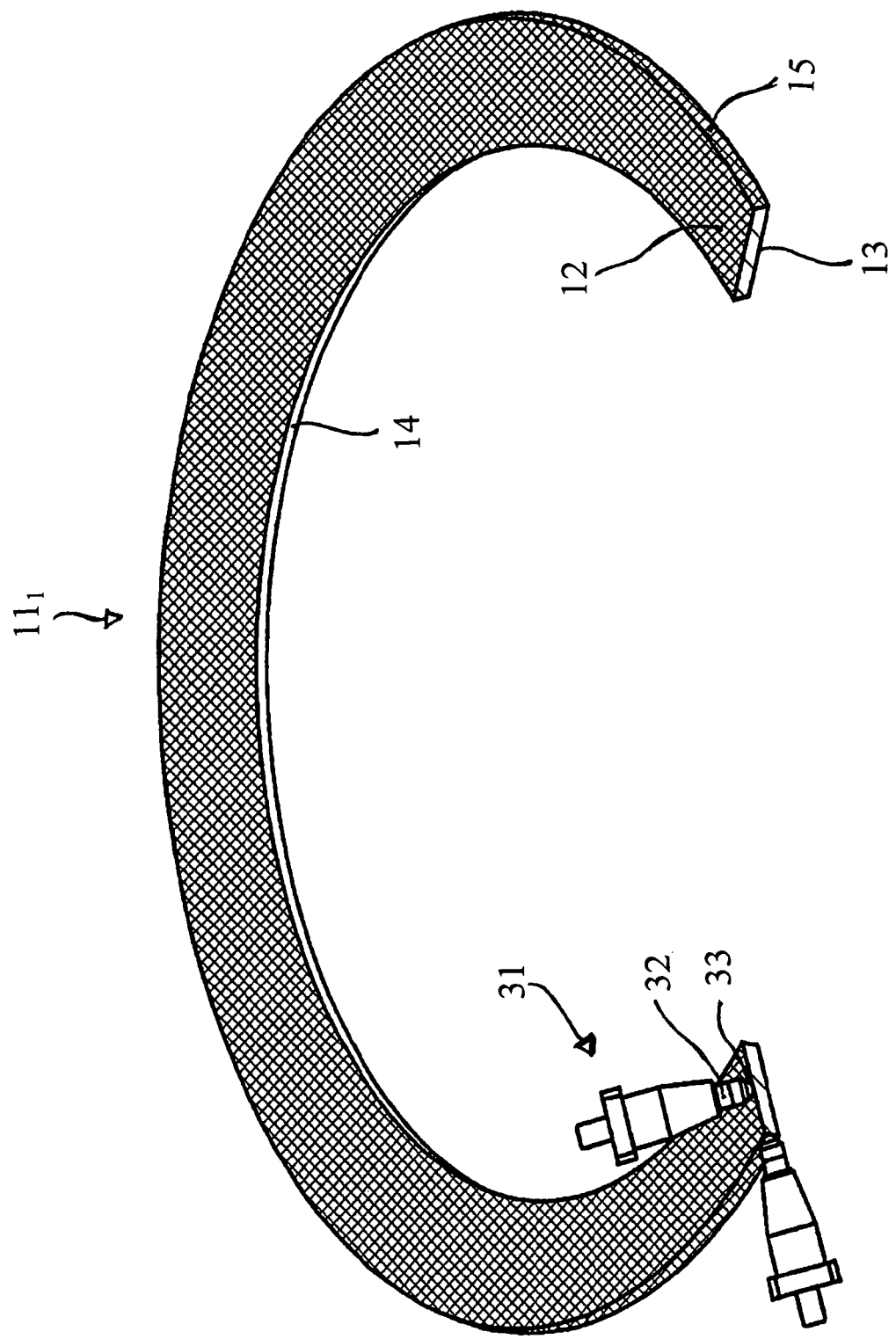
FIG. 2 illustrates a second embodiment of an inventive plate spring of a first type while being rollingly compressed.

FIG. 2, in this way, shows the underside 12 and the outer annular edge 15 being rollingly compressed.

Figure 3:
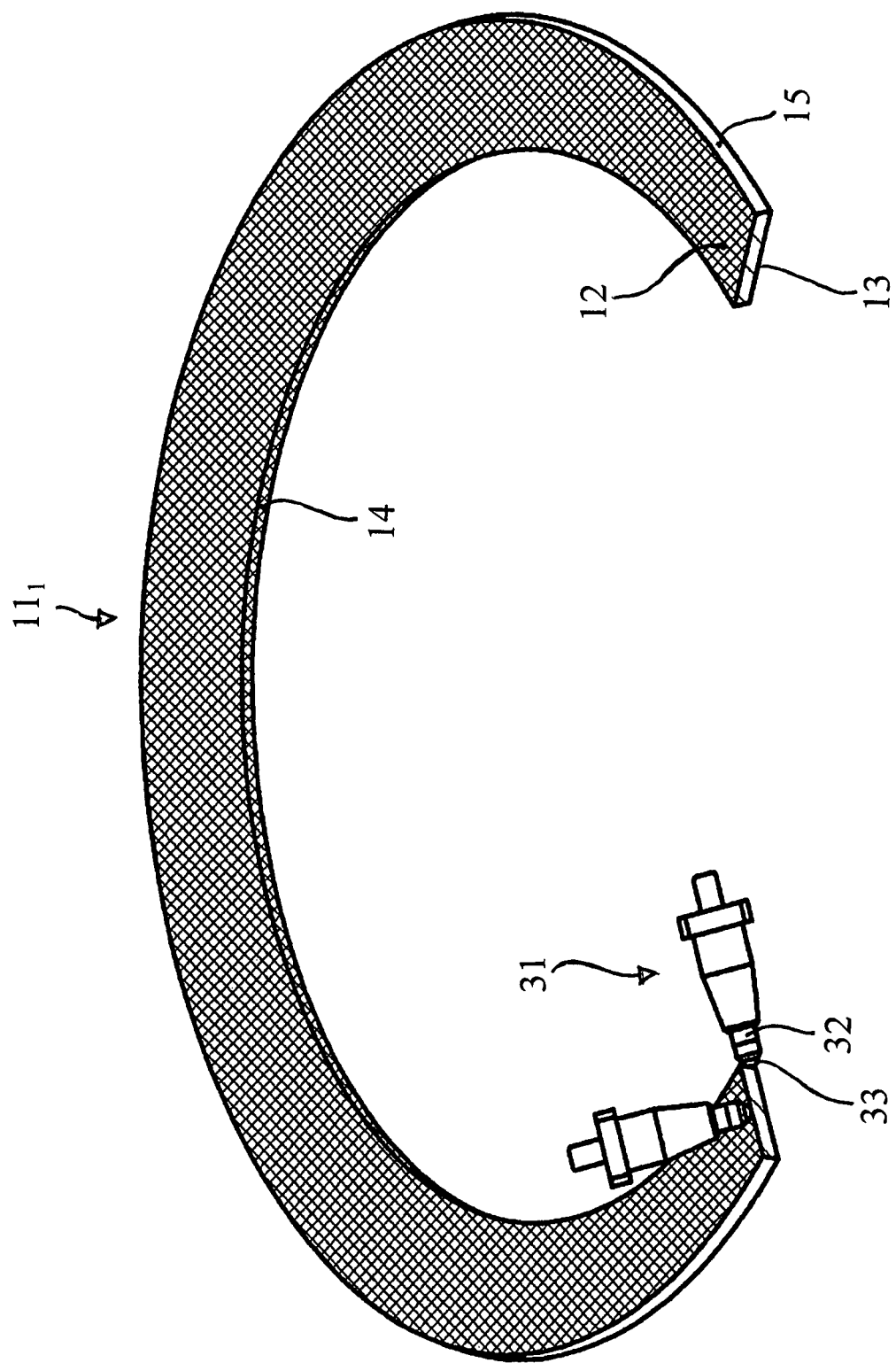
FIG. 3 illustrates a third embodiment of an inventive plate spring of a first type while being rollingly compressed.

FIG. 3, in this way, shows the underside 12 and the inner annular edge 14 being rollingly compressed.

Figure 4:
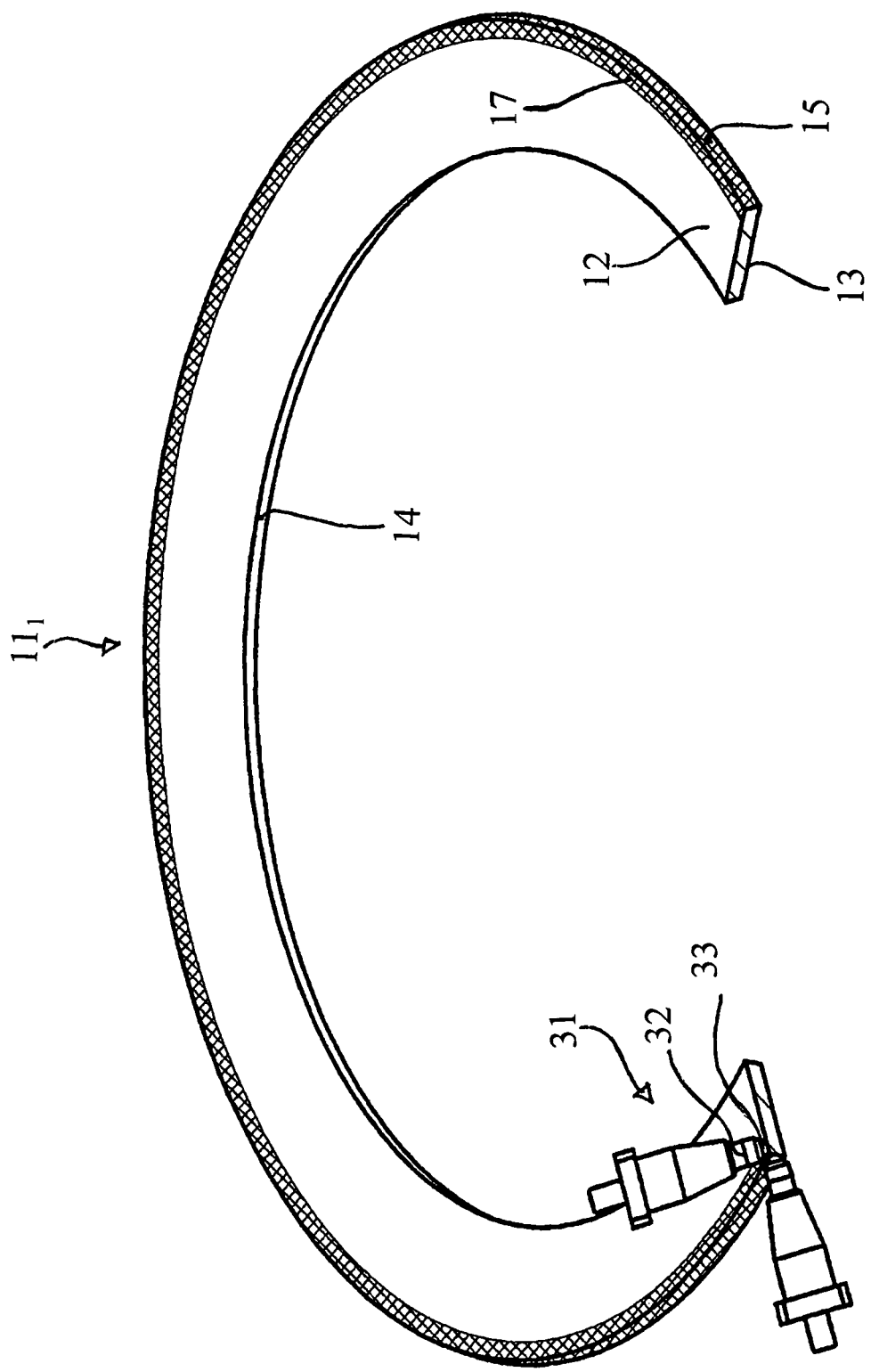
FIG. 4 illustrates a fourth embodiment of an inventive plate spring of a first type while being rollingly compressed.

FIG. 4, in this way, shows the outer annular edge 15 and a narrow adjoining boundary region 17 of the underside 12 being rollingly compressed.

Figure 5:
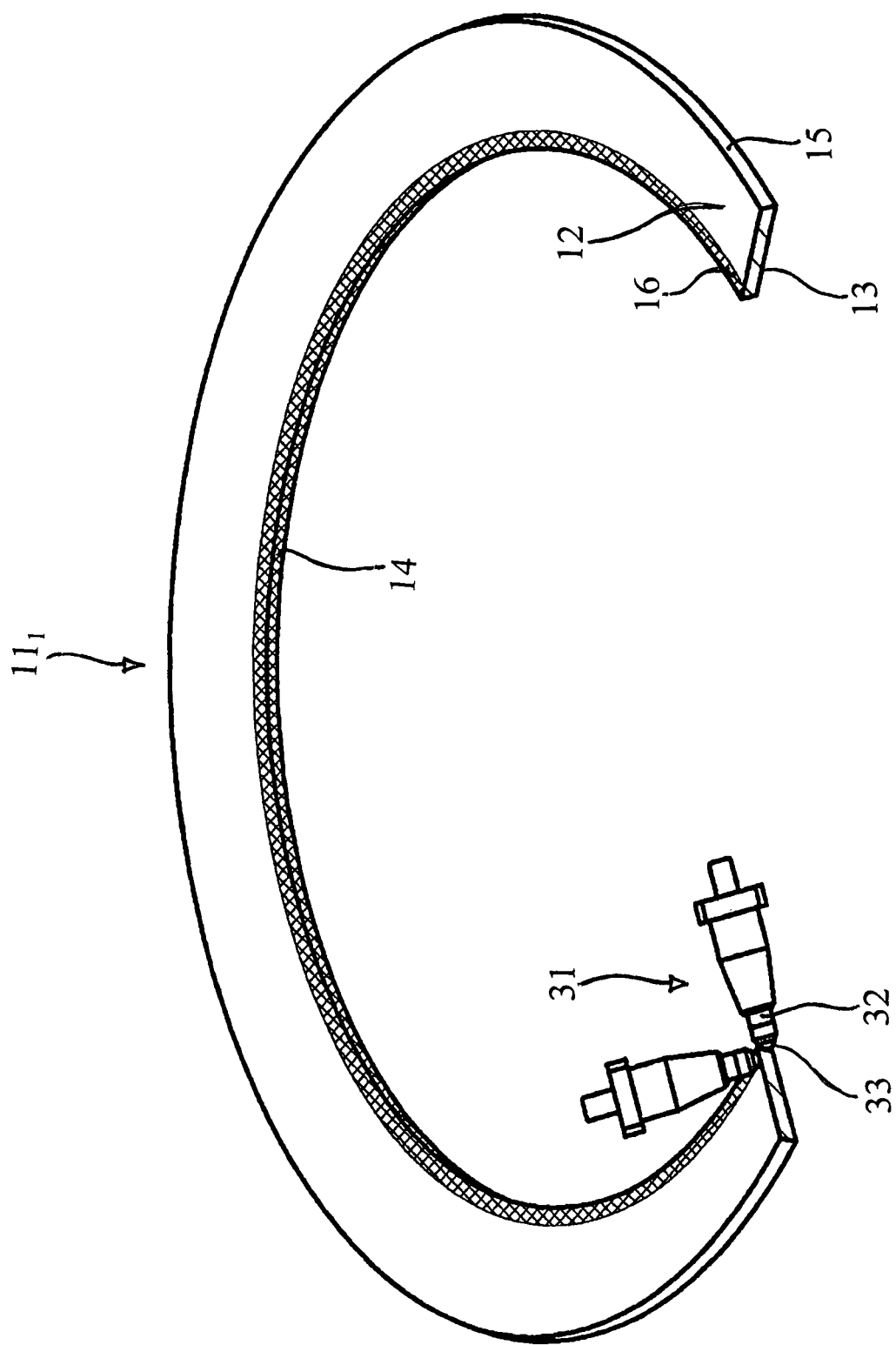
FIG. 5 illustrates a fifth embodiment of an inventive plate spring of a first type while being rollingly compressed.

FIG. 5, in this way, shows the inner annular edge 14 and a narrow boundary region 16 of the underside 12 adjoining said inner annular edge 14 being rollingly compressed.

Figure 6:
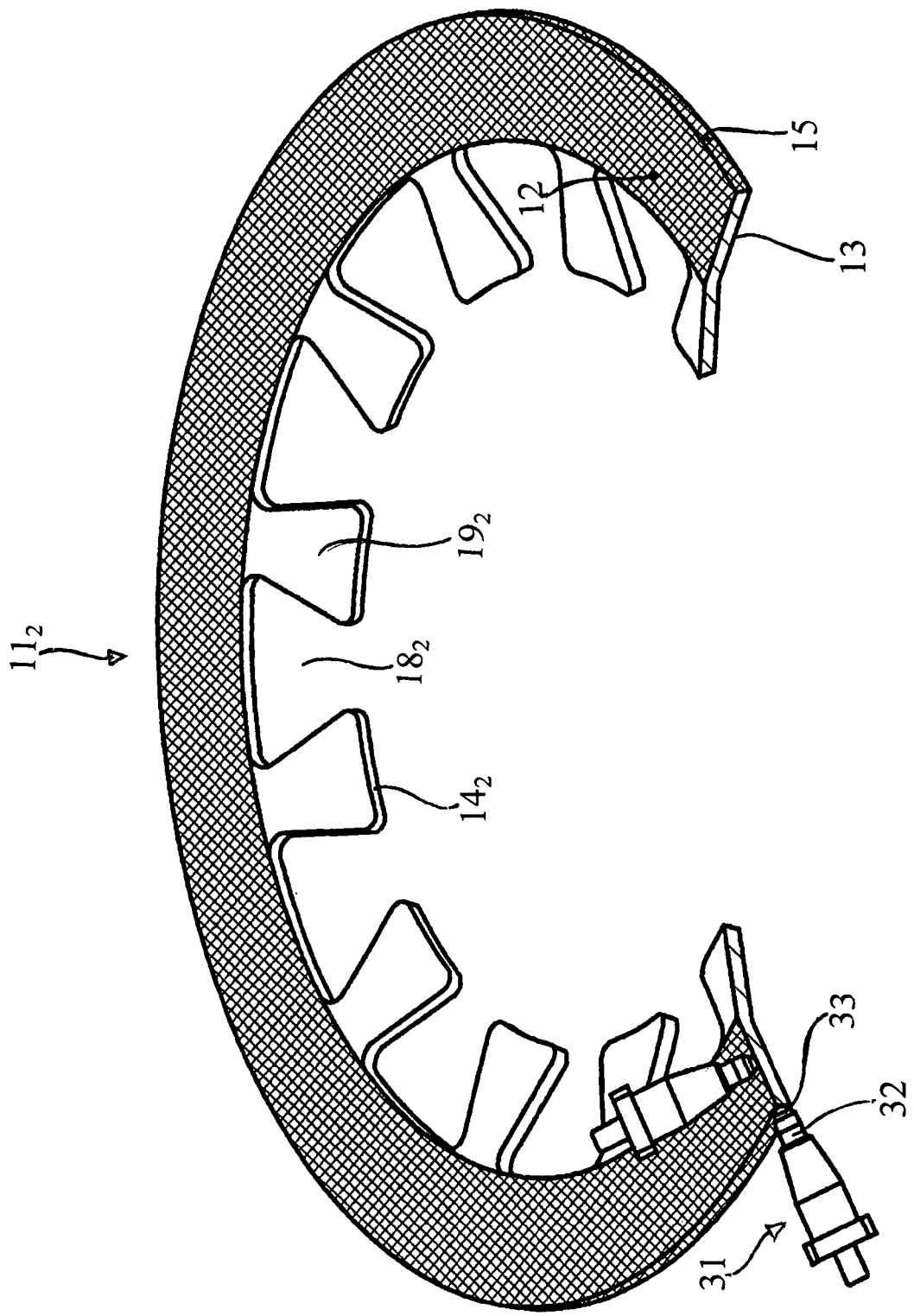
FIG. 6 illustrates sixth embodiment of an inventive plate spring of a second type while being rollingly compressed.
Figure 7:
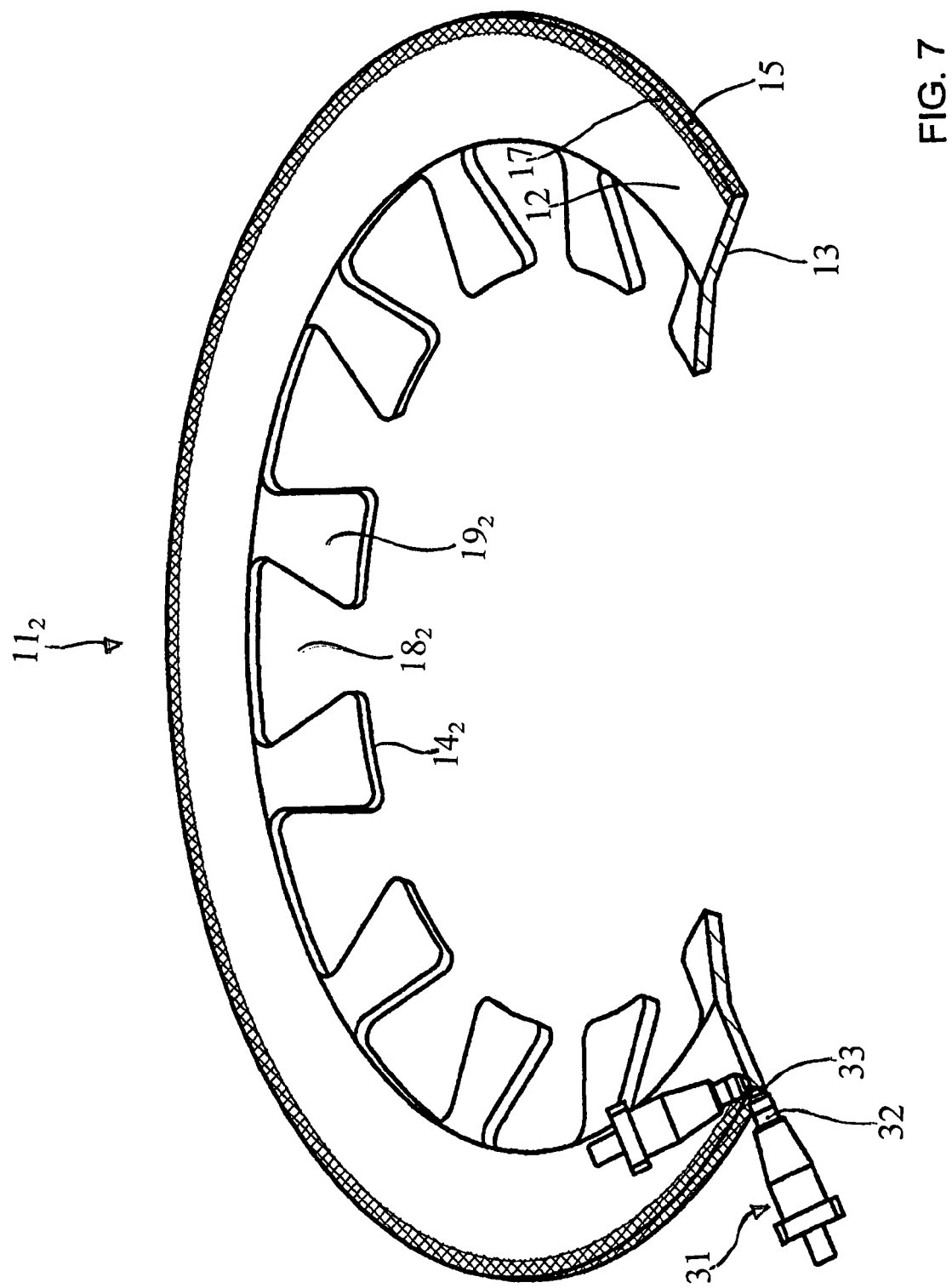
FIG. 7 illustrates a seventh embodiment of an inventive plate spring of a second type while being rollingly compressed.

FIGS. 6 and 7 are first described jointly. A plate spring $11_2$ is illustrated in the same way as in FIGS. 1 to 5, with the plate spring $11_2$ being slotted on its inside, so that, as before, there exists a smooth outer annular edge 15, but, on the inside, trapezoidal slots $18_2$ and trapezoidal tabs $19_2$ determine the extension of the inner annular edge $14_2$. The tabs $19_2$ are not subjected to boundary layer compression.

In FIG. 6, rolling compression covers the underside 12 and the outer annular edge 15.

In FIG. 7, rolling compression covers the outer annular edge 15 and a narrow adjoining boundary region 17 of the underside 12.

Figure 8:
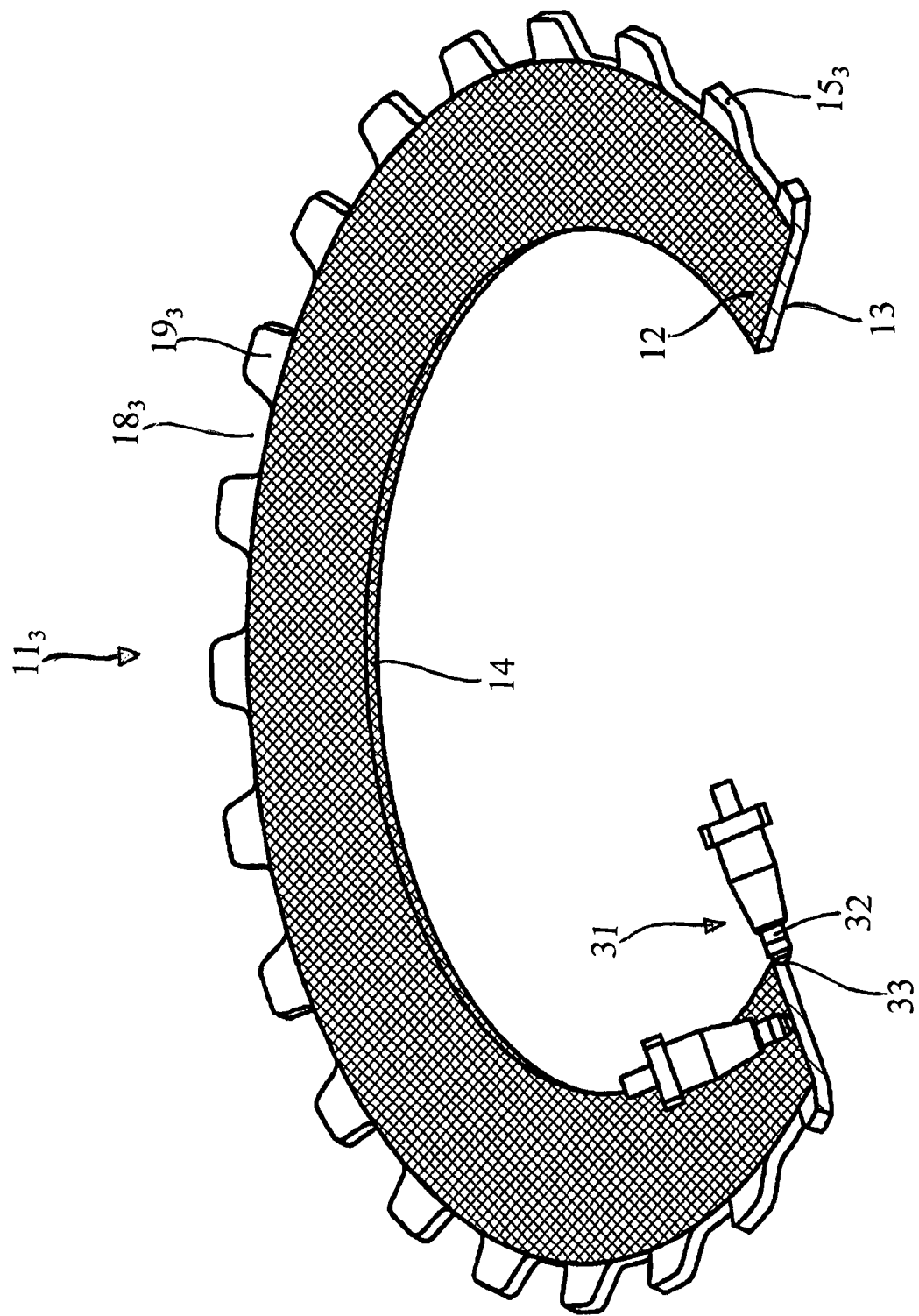
FIG. 8 illustrates an eighth embodiment of an inventive plate spring of a third type while being rollingly compressed.

FIG. 8 shows a plate spring $11_3$ basically in the same illustration as in FIGS. 1 to 5, but with the plate spring $11_3$ being slotted on the outside, so that there exists only one smooth continuous inner annular edge 14, whereas the outer annular edge $15_3$ is defined by trapezoidal slots $18_3$ and tabs $19_3$. Rolling compression does not cover the tabs $19_3$. Instead, it is the underside 12 and the inner annular edge 14 of the plate spring $11_3$ which are subjected to rolling compression.

Figure 9:
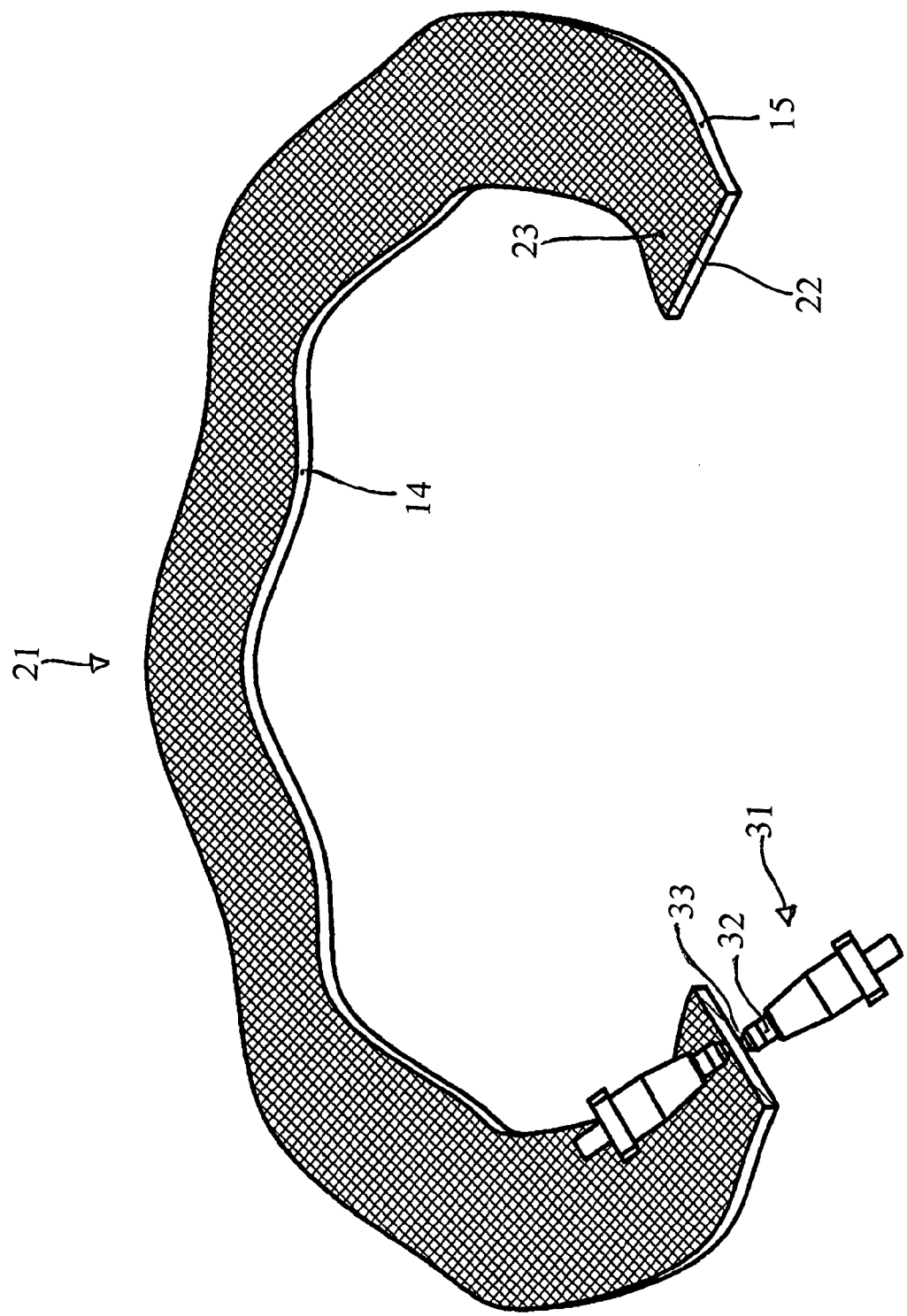
FIG. 9 illustrates a first embodiment of an inventive undulating spring while being rollingly compressed.
Figure 10:
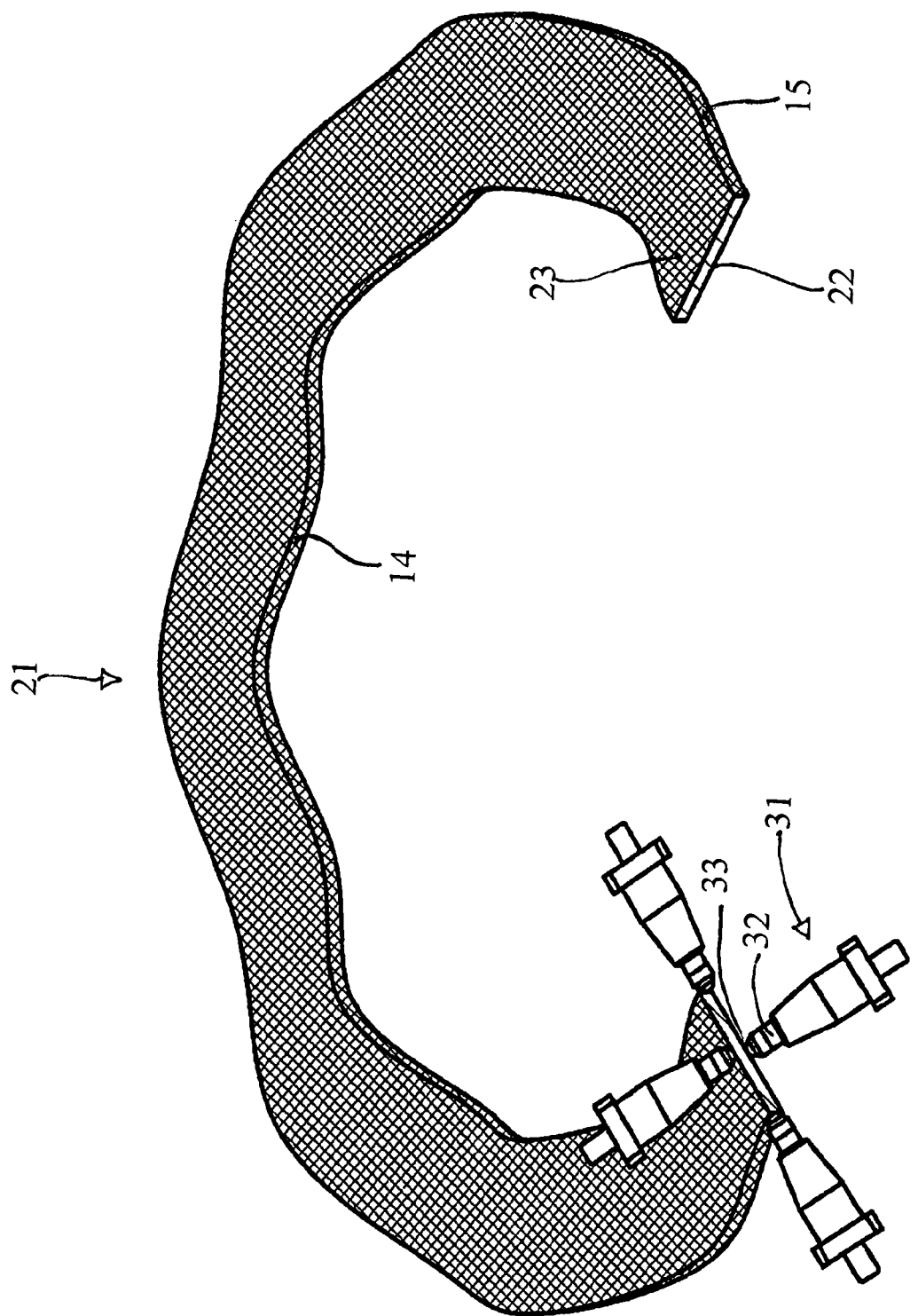
FIG. 10 illustrates a second embodiment of an inventive undulating spring while being rollingly compressed.
Figure 11:
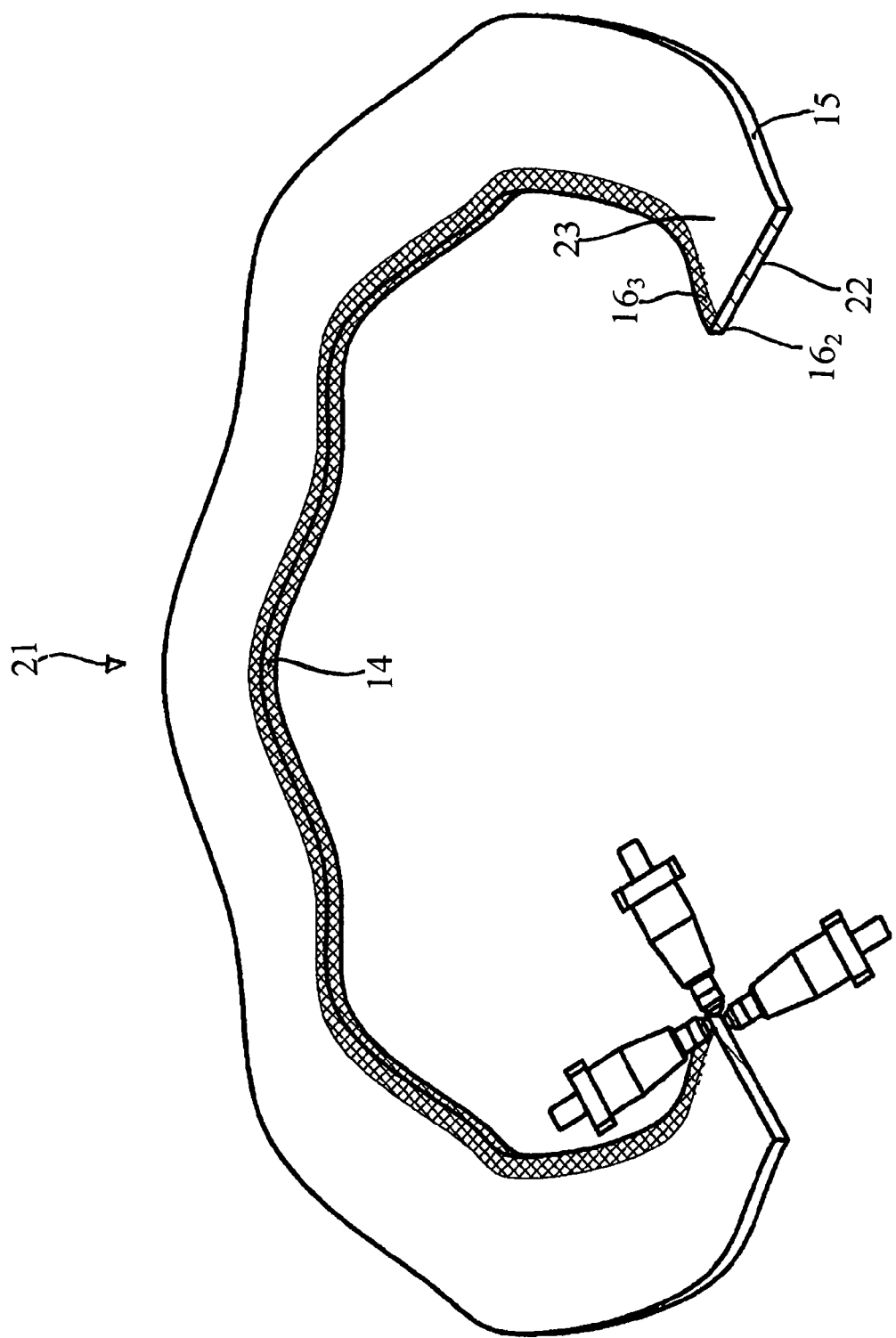
FIG. 11 illustrates a third embodiment of an inventive undulating spring while being rollingly compressed.

FIGS. 9 to 11 will first be described jointly. They each show an undulating spring 21 in a 3D illustration of which a front partial region has been cut away. The undulating spring, as a whole, constitutes a compete annulus. In accordance with its definition, the circumference of the undulating spring is undulating and it shows to comprise upper and lower sides which extend parallel relative to one another. As far as details are concerned, there are shown an underside 22, an upper side 23, an inner annular edge 14 and an outer annular edge 15. In a cross-sectional view, the undulating spring is rectangular, i.e. it consists of sheet metal with a substantially uniform thickness. In one embodiment there is no conicity in the undulating spring 21, but it can be added to the undulation as an additional design criterion. The tool 31 is clamped into a tool holding device (not shown) which is numerically controlled and, more particularly, is movable around three axes. The tool 31 comprises a ball holding device 32 which is hydrostatically supported and displaceable relative to the tool 31. At its front end, the ball holding device 32 carries a freely rotatable ball 33 consisting of hard ceramics for example. By means not illustrated, the undulating spring can be clamped on and rotatingly driven around its axis, with the tool 31 being moved forwards across the surfaces of the plate spring. In the process, there is generated a contact pressure of the ball 33, which contact pressure plastically deforms the surfaces and, at the same time, generates an internal compressive stress in the boundary layer. The surfaces subjected to strength rolling are shown in a dark shade in the Figures, and for clarification purposes, the tool 31 is shown in a position on the treated surfaces.

In FIG. 9, the underside 22 and the upper side 23 are subjected to rolling compression.

In FIG. 10, the underside 22, the upper side 23 and the inner and outer annular edges 14, 15 are subjected to rolling compression.

In FIG. 11, the inner annular edge 14 and two delimited boundary regions $16_2$, $16_3$ adjoining the inner annular edge 14 on the underside 22 and the upper side 23 respectively are subjected to rolling compression.

Figure 12:
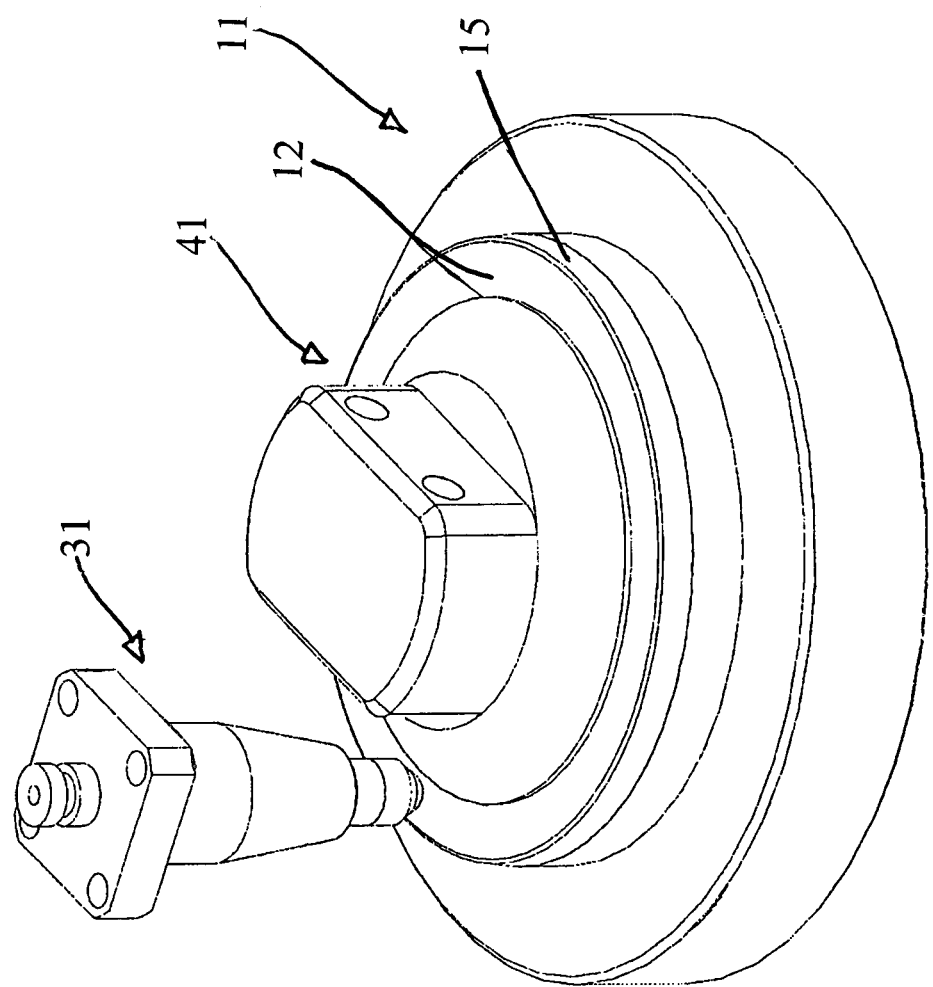
FIG. 12 illustrates a device for carrying out the inventive process in a first embodiment in a 3D illustration.
Figure 13:
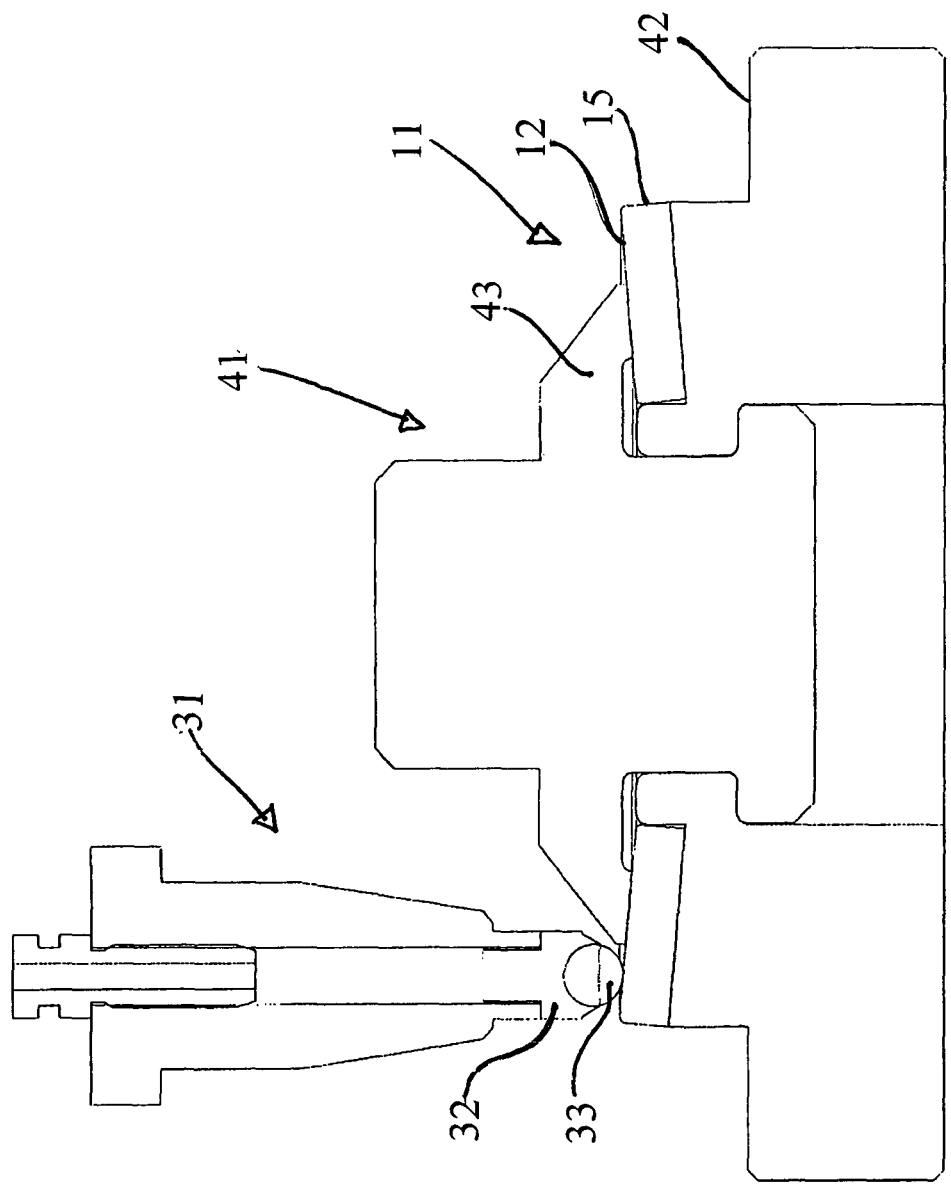
FIG. 13 illustrates the device according to FIG. 12 in an axial section.

FIGS. 12 and 13 will be described jointly below. They show a two-part holding device 41 comprising a supporting ring 42 for a plate spring or undulating spring and a clamping insert 43 which acts on the plate spring or undulating spring and can be clamped bayonet-like relative to the supporting ring 42. When the supporting ring 42 and the clamping insert are clamped relative to one another, the plate spring or undulating spring is pressed flat into a planar position, and in this embodiment of the holding device, an outer part of the underside and the outer annular edge of the plate spring or undulating spring are freely accessible for the rolling tool 31. With a rotatingly driven holding device 41, it is possible for the rolling tool 31 positioned under pressure to be moved in the radial direction along the underside 12, 22 and in the axial direction along the outer annular edge 15.

Figure 14:
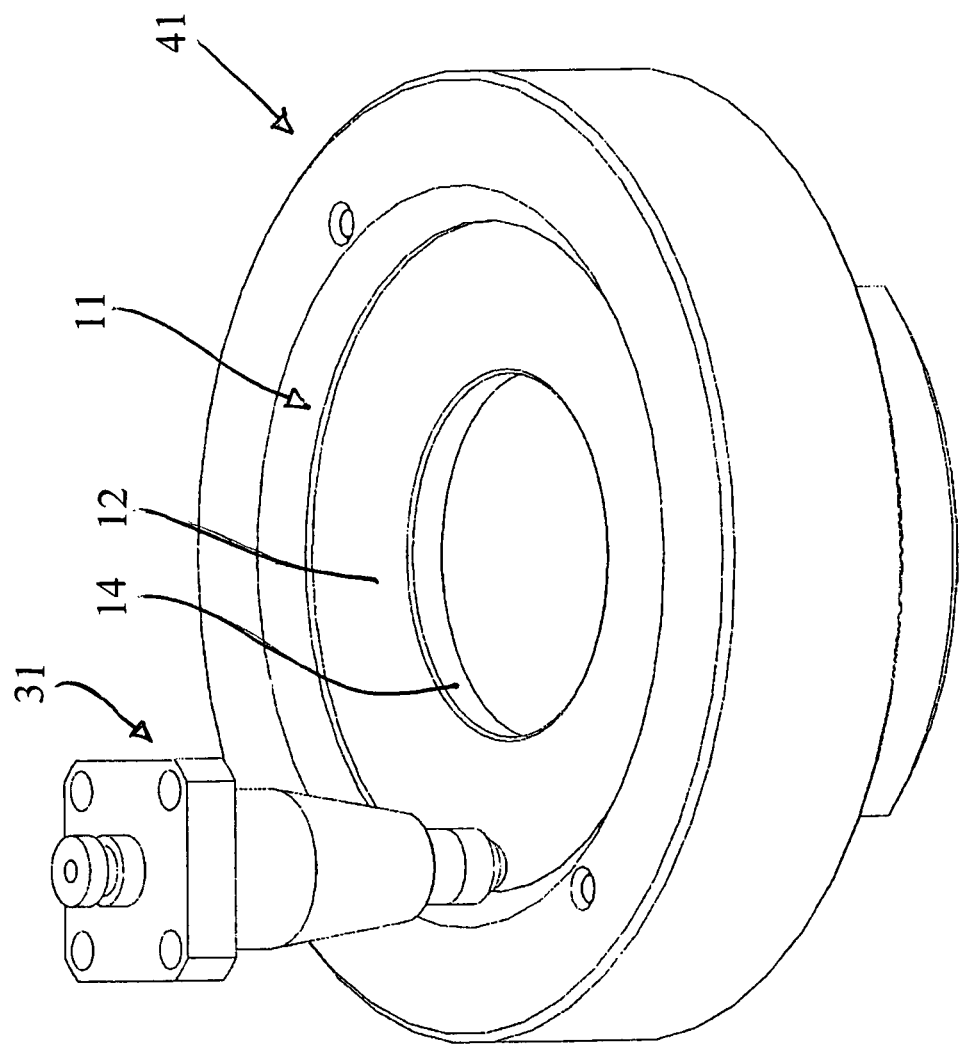
FIG. 14 illustrates a device for carrying out the inventive process in a second embodiment in a 3D illustration.
Figure 15:
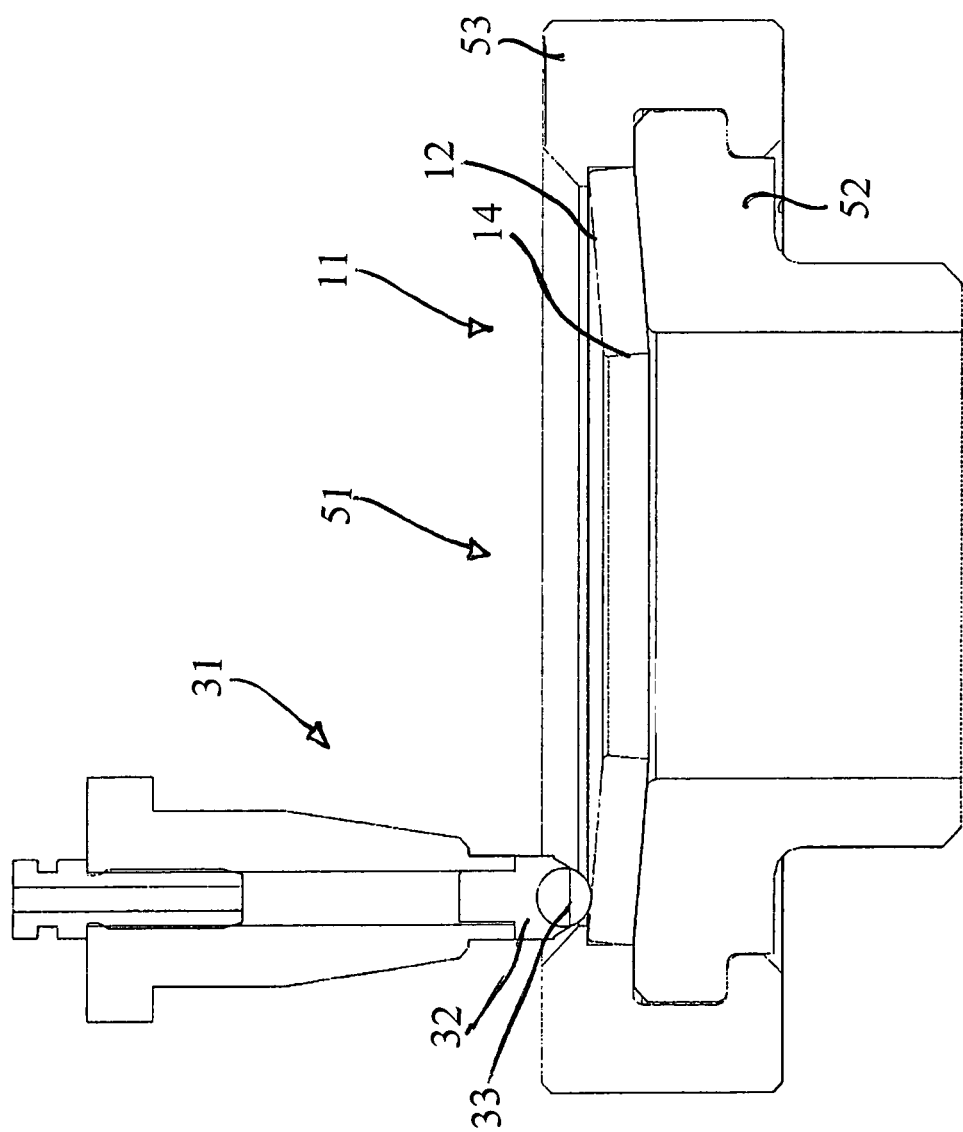
FIG. 15 illustrates the device according to FIG. 14 in a longitudinal section.

FIGS. 14 and 15 will be described jointly below. They show a two-part holding device 51 comprising a supporting ring 52 for a plate spring or undulating spring and a clamping upper part 53 which acts on the plate spring or undulating spring and can be clamped bayonet-like relative to the supporting ring 42. In a clamped condition the plate spring or undulating spring is pressed flat, and in this embodiment of the holding device, an inner part of the underside and the inner annular edge 14 are freely accessible for the rolling tool 31. With a rotatingly driven holding device, it is possible for the rolling tool 31 positioned under pressure to be moved in the radial direction along the underside and in the axial direction along the inner annular edge 15.

Figure 16:
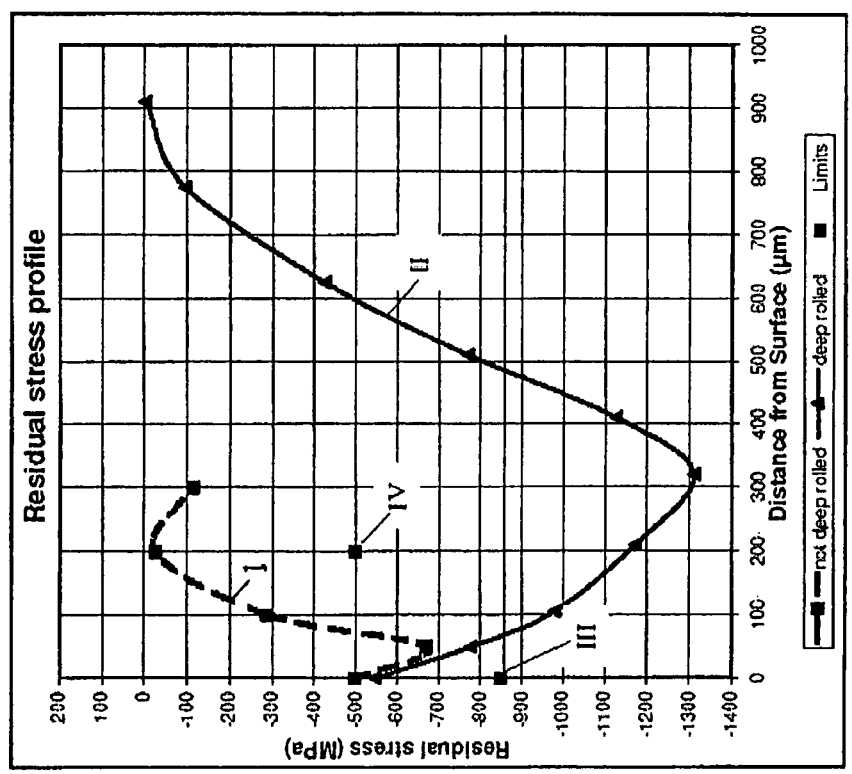
FIG. 16 illustrates the stress curve in the boundary layer of a plate spring or undulating spring produced in accordance with the invention, as compared to the stress curve of shot-peened boundary layer.

FIG. 16 shows the stress curve in the boundary layer of the surface region treated in accordance with the invention in MPa as a function of the distance from the surface in µ3 m as compared to the stress curve in the boundary layer of a plate spring or undulating spring according to the state of the art, with an upper curve I showing the result of a process according to the state of the art after the plate spring or undulating spring has been shot-peened and curve II showing the result of a process in accordance with an inventive process while the plate spring or undulating spring is clamped in, i.e. during the rolling compression of a spring which, in this case, has been pressed into the planar position. The internal compressive stress values of the lower curve II are clearly higher and extend deeper into the boundary layer than in the case of curve I after a shot peening process.

Figure 17:
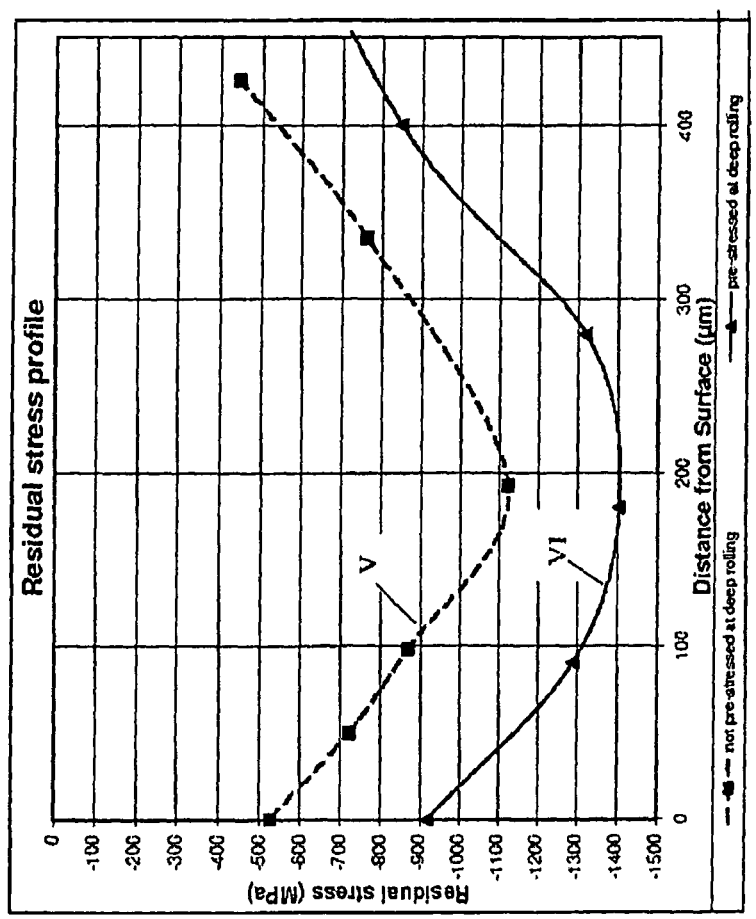
FIG. 17 illustrates the stress curve in the boundary layer of a plate spring or undulating spring produced in accordance with the invention, in a comparison with two different processes.

FIG. 17 shows the stress curve in the boundary layer of a surface region treated in accordance with the invention by rolling compression in MPa as a function of the distance from the surface in µm in two variants, wherein an upper curve V shows the result of an inventive process without the plate spring or undulating spring being clamped in, i.e. rolling compression with the load-free spring on its own being supported, and the lower curve VI shows the result of an inventive process with the plate spring or undulating spring being clamped in, i.e. rolling compression of a spring which, in this case, is pressed into the planar position. The internal compressive stress values of the upper curve are clearly higher than, and extend deeper into the boundary layer than, the values achieved with a shot peening process. The internal compressive stress curves of the lower curve are improved even further. Furthermore, the graphics illustrate the claimed minimum value for the maximum of the internal compressive stress with III and the claimed minimum value for the internal compressive stress at a depth of 200 µm with IV.

FIGS. 18 to 22 will be described jointly below. Each shows a plate spring III in a 3D illustration in which a front partial region has been cut away. The plate spring constitutes a complete annulus. Conicity, or a cone shaped aspect is provided such that the point of the opening cone of the parallel upper side and lower side is positioned underneath the spring ring. The side positioned on top is referred to as the underside 12 and the side positioned at the bottom is referred to as the upper side 13. There is also differentiated between an inner annular edge 14 and an outer annular edge 15. In a cross-sectional view the plate spring $11_1$ is rectangular, i.e. it consists of sheet metal of a substantially uniform thickness. The surface regions subjected to shot peening compression are shown in grey. FIGS. 1 to 5 each show a shot peening device 61 in different positions, with the different positions symbolising the shot peening compression of different surface regions. The device 61 is clamped into tool holding device (not shown) which, while numerically controlled, can be moved more particularly around three axes. By means not illustrated, the plate spring $11_1$ can be clamped on and rotatingly driven around its axis, with the device 61 being aligned relative to the surfaces of the plate spring. In the surfaces 33, there is generated a pressure pulse which plastically deforms the surfaces and, in the process, generates an internal pressure stress in the boundary layer. The surfaces treated by shot peening are illustrated in a dark shade, and for clarification purposes, the device is shown in a position at the treated surfaces. To be able to differentiate between the upper side and the underside, the spring is shown in a stress-relieved position, whereas the actual shot peening takes place at the pretensioned, more particularly flat-pressed plate spring.

Figure 18:
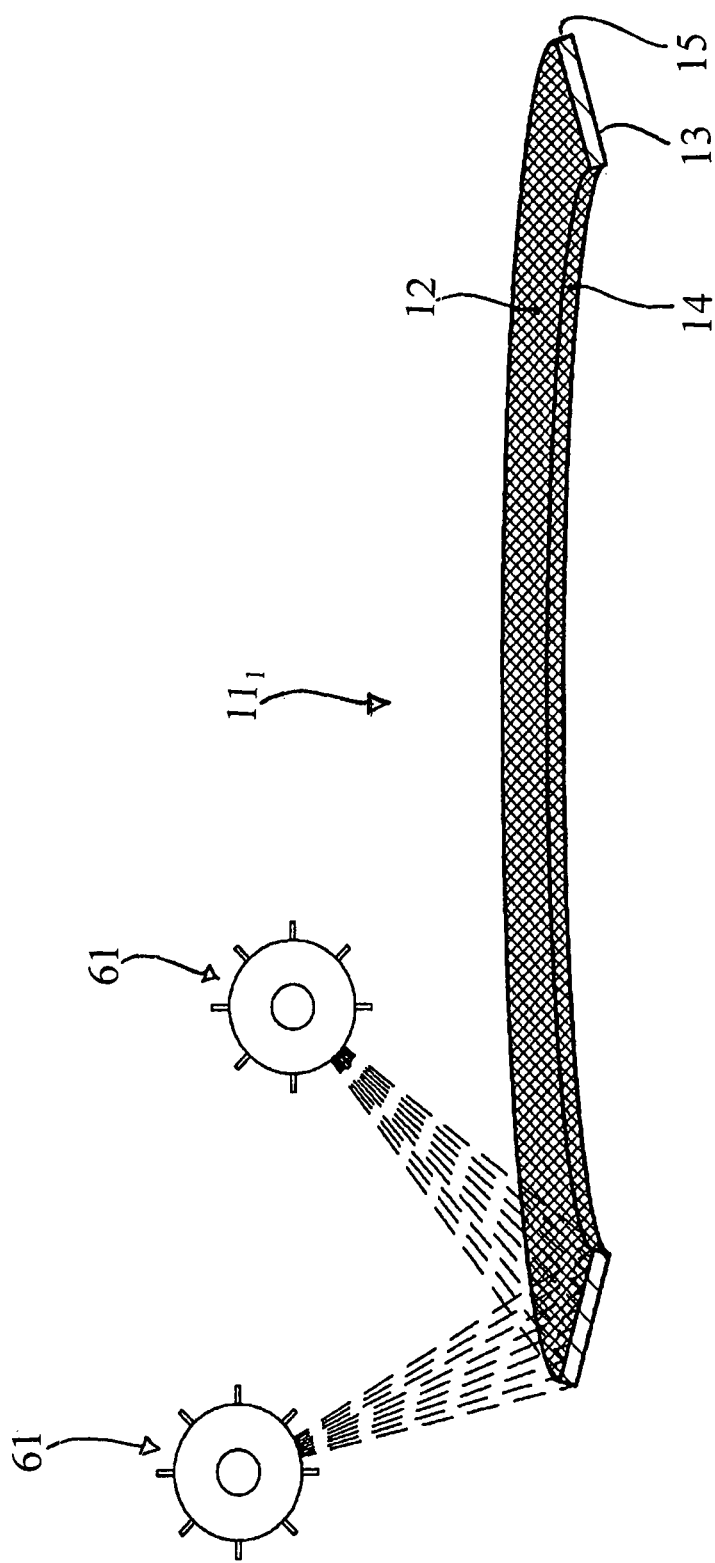
FIG. 18 illustrates a first embodiment of an inventive plate spring of a first type during compression by shot peening.

FIG. 18, in this way, shows the underside 12, the inner annular edge 14 and the outer annular edge 15 being compressed by shot peening under tensile stress.

Figure 19:
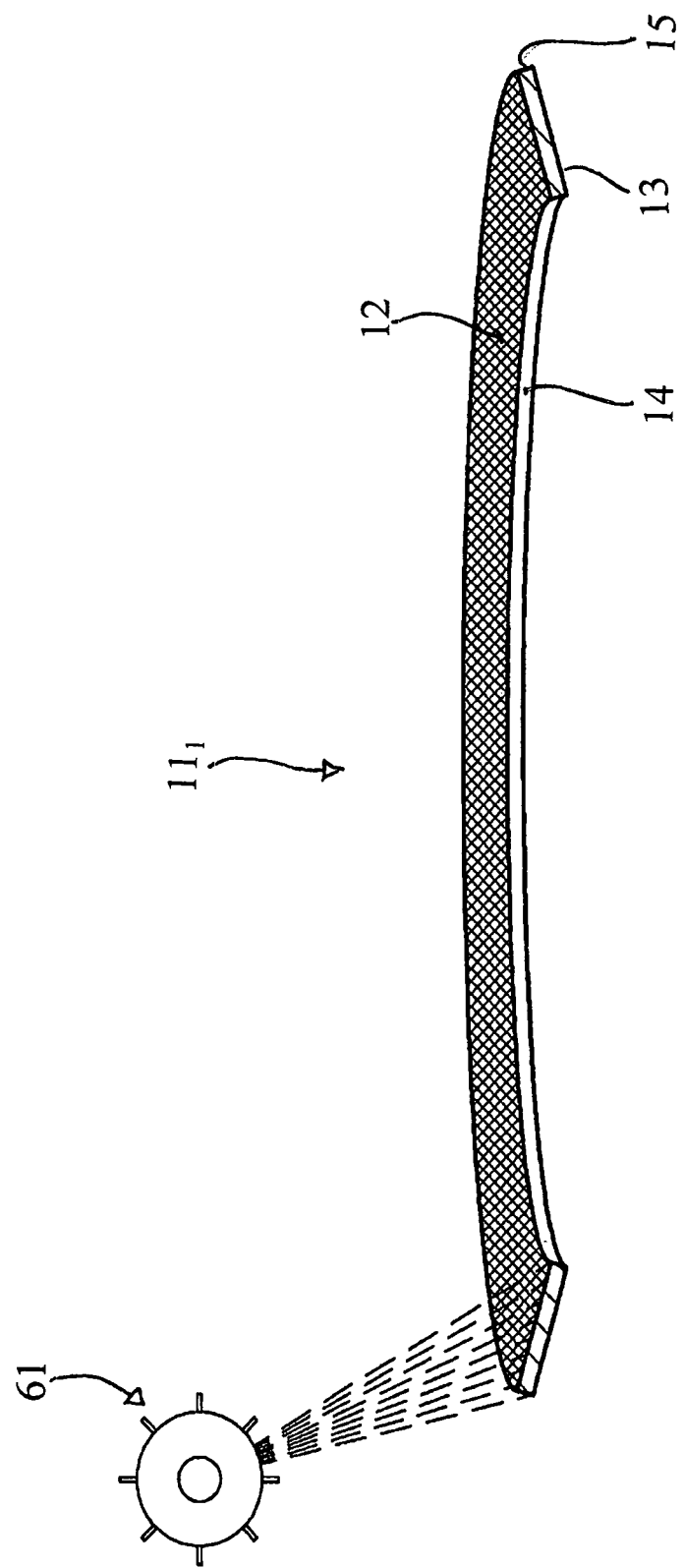
FIG. 19 illustrates a second embodiment of an inventive plate spring of a first type during compression by shot peening.

FIG. 19, in this way, shows the underside 12 and the outer annular edge 15 being compressed by shot peening under tensile stress.

Figure 20:
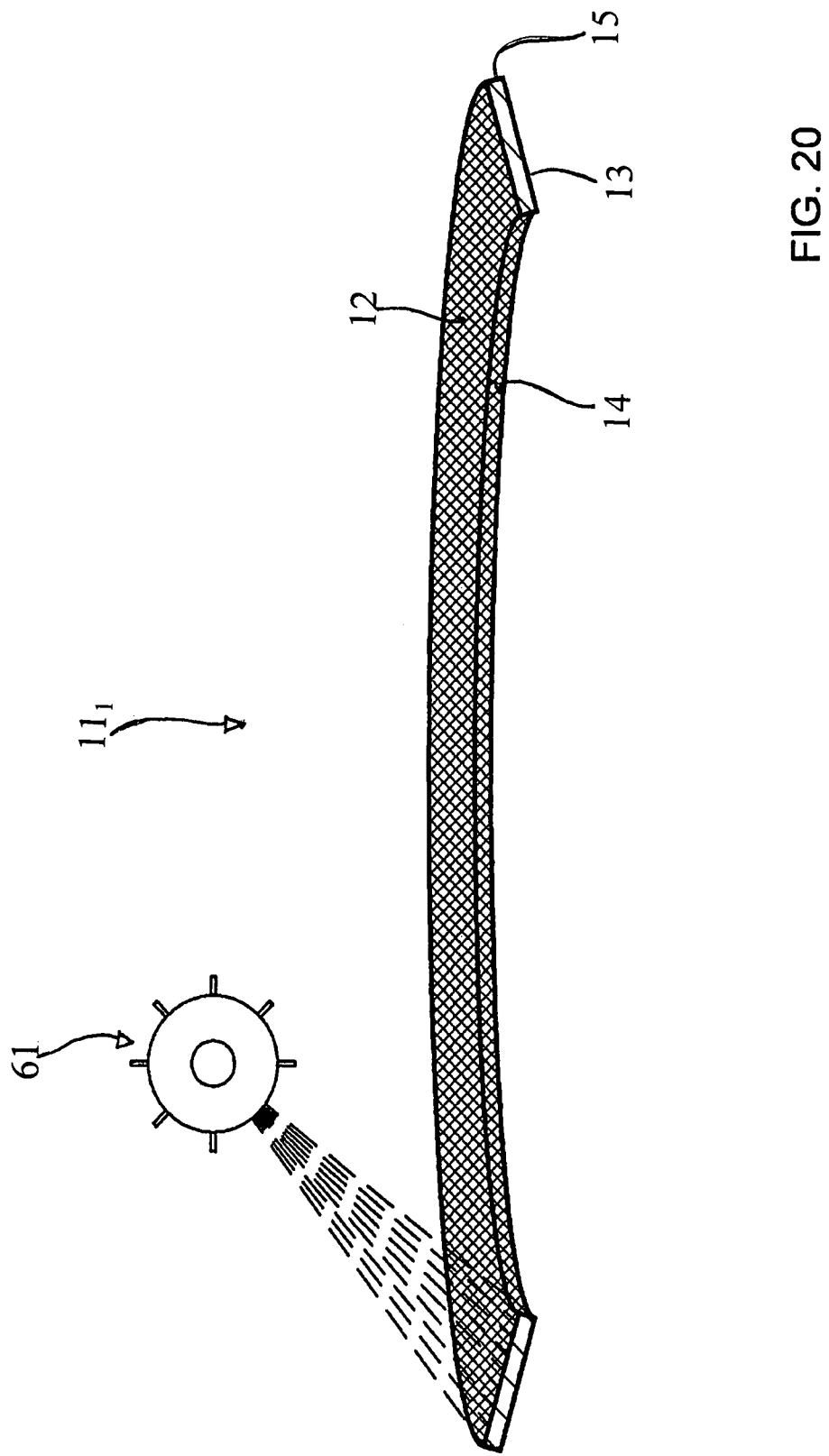
FIG. 20 illustrates a third embodiment of an inventive plate spring of a first type during compression by shot peening.

FIG. 20, in this way, shows the underside 12 and the inner annular edge 14 being compressed by shot peening under tensile stress.

Figure 21:
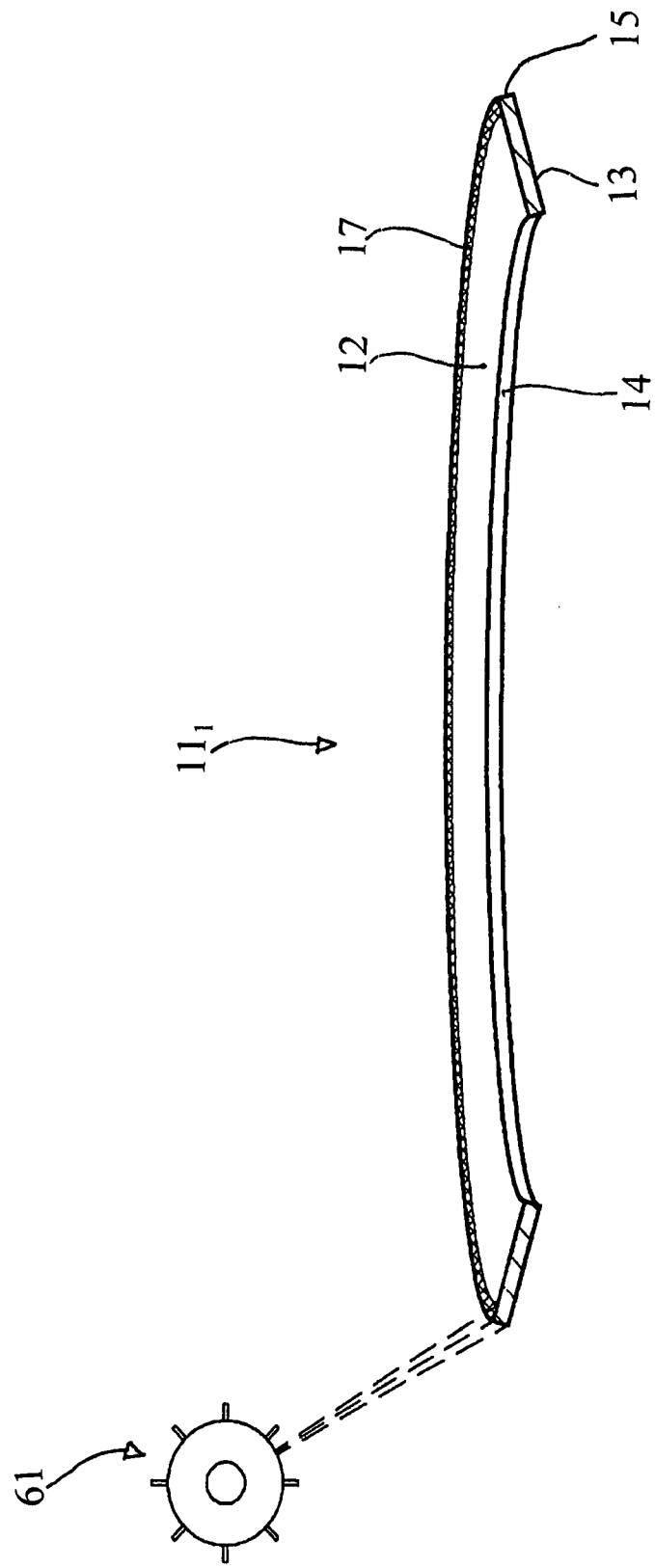
FIG. 21 illustrates a fourth embodiment of an inventive plate spring of a first type during compression by shot peening.

FIG. 21, in this way, shows the outer annular edge 15 and an adjoining narrow boundary region 17 of the underside 12 to be compressed by shot peening under tensile stress.

Figure 22:
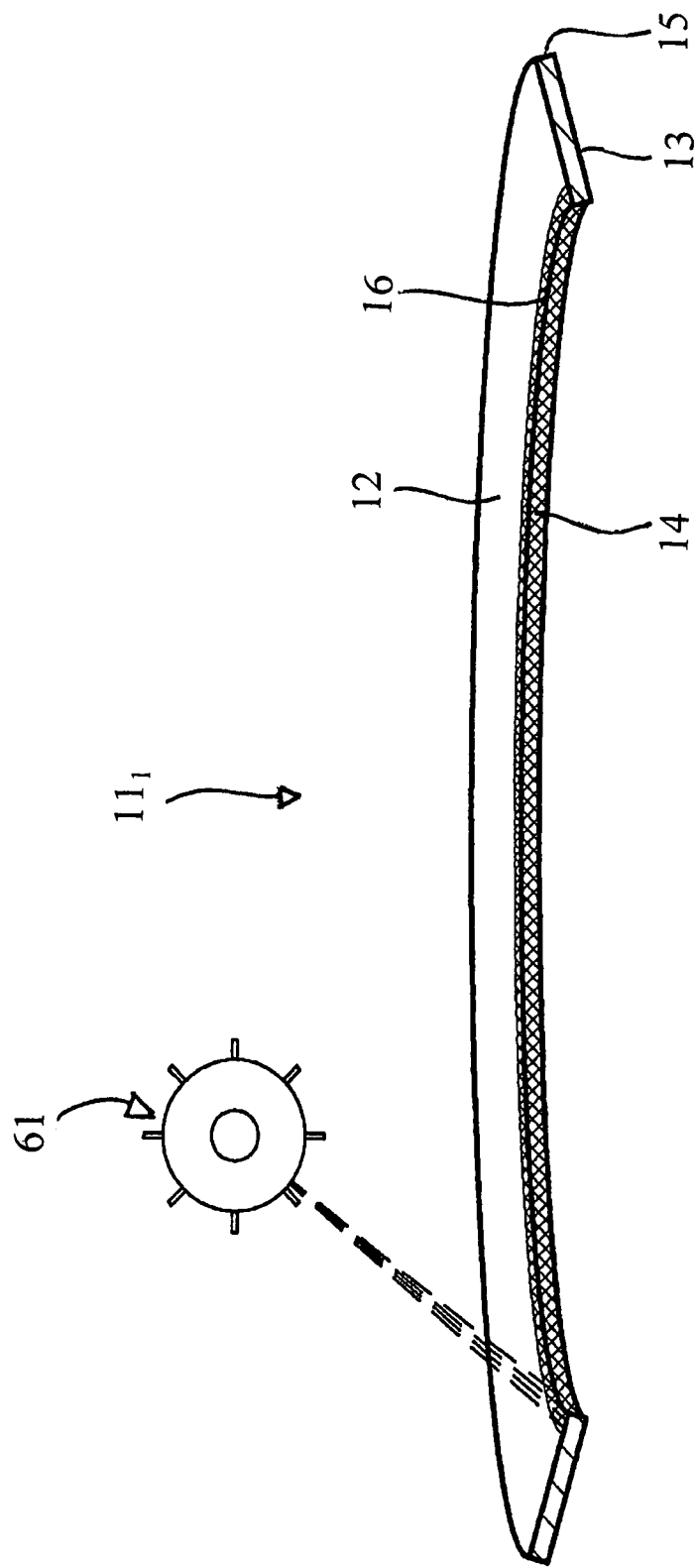
FIG. 22 illustrates a fifth embodiment of an inventive plate spring of a first type during compression by shot peening.

FIG. 22, in this way, shows the inner annular edge 14 and a narrow adjoining boundary region 16 of the underside 12 being compressed by shot peening under tensile stress.

Figure 23:
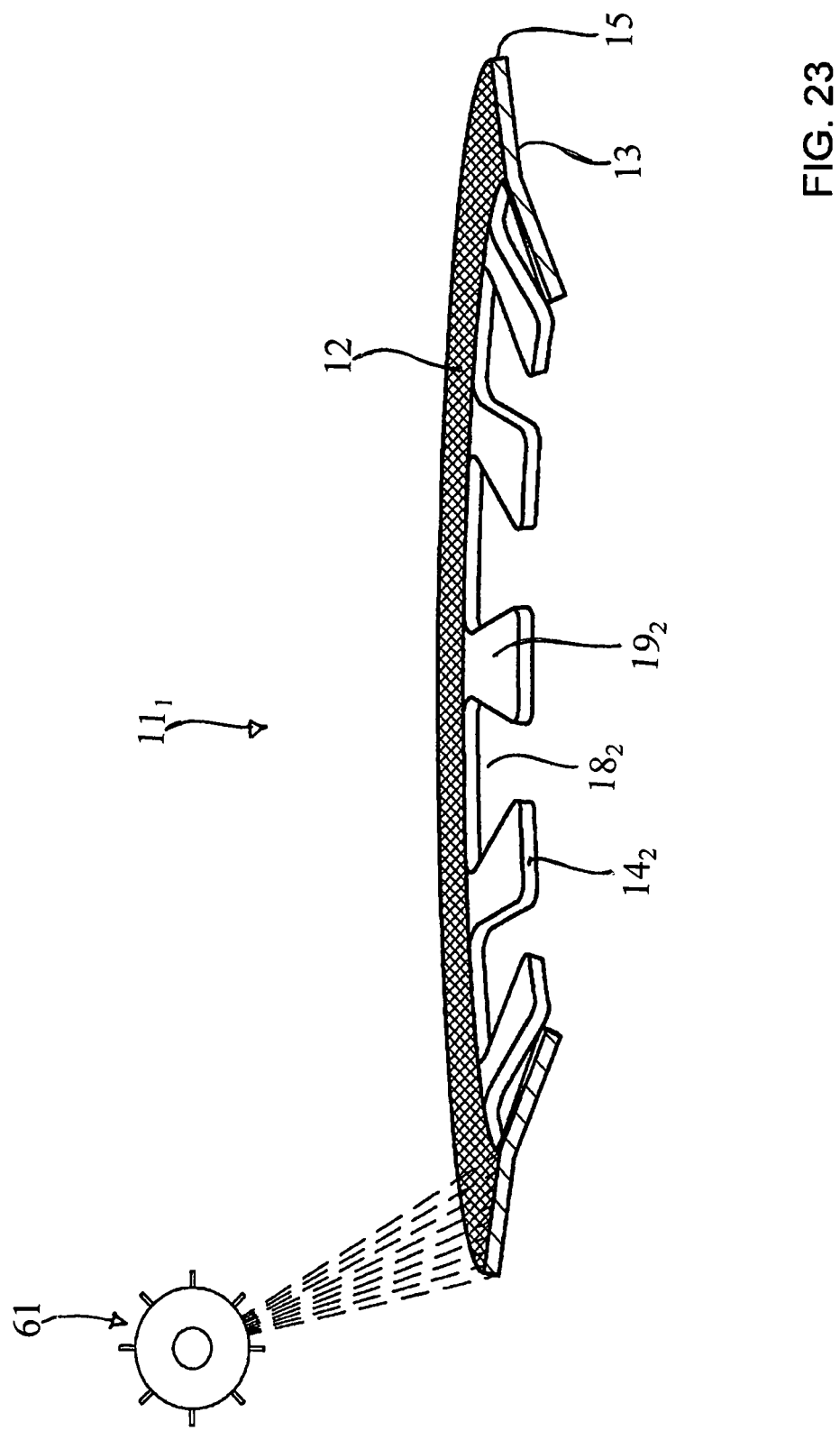
FIG. 23 illustrates a sixth embodiment of an inventive plate spring of a second type during compression by shot peening.
Figure 24:
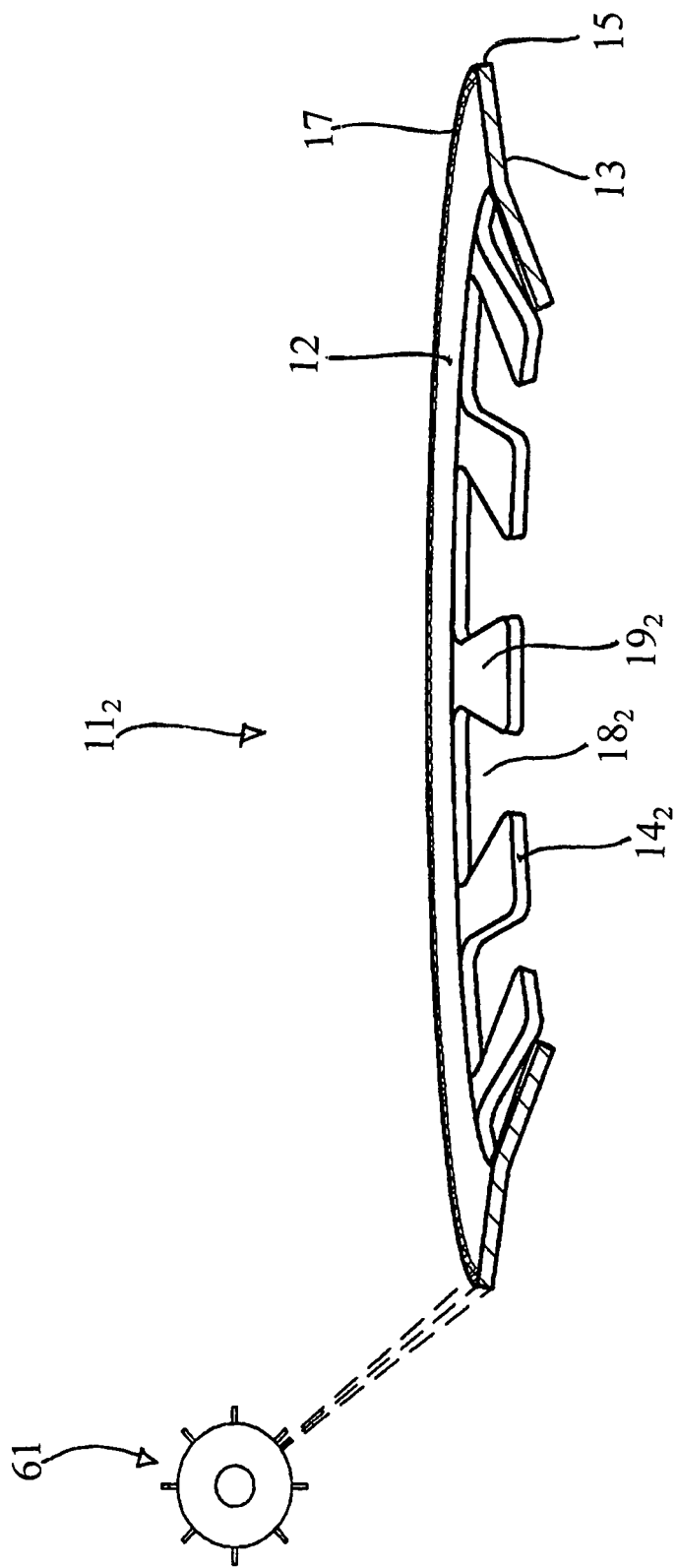
FIG. 24 illustrates a seventh embodiment of an inventive plate spring of a second type during compression by shot peening.

FIGS. 23 and 24 will first be described jointly. They illustrate a plate spring $11_2$ in the same way as it is illustrated in FIGS. 1 to 5, but with the plate spring $11_2$ being slotted on its inside, so that there exists, as previously, a smooth outer annular edge 15, but on the inside, trapezoidal slots $18_2$ and trapezoidal tabs $19_2$ determine the extension of the inner annular edge $14_2$. The tabs $19_2$ are not subjected to boundary layer compression.

In FIG. 23, it is the underside 12 and the outer annular edge 15 which are subjected to shot peening under tensile stress.

In FIG. 24, it is the outer annular edge 15 and an adjoining narrow boundary region 17 of the underside 12 which are subjected to shot peening under tensile stress.

Figure 25:
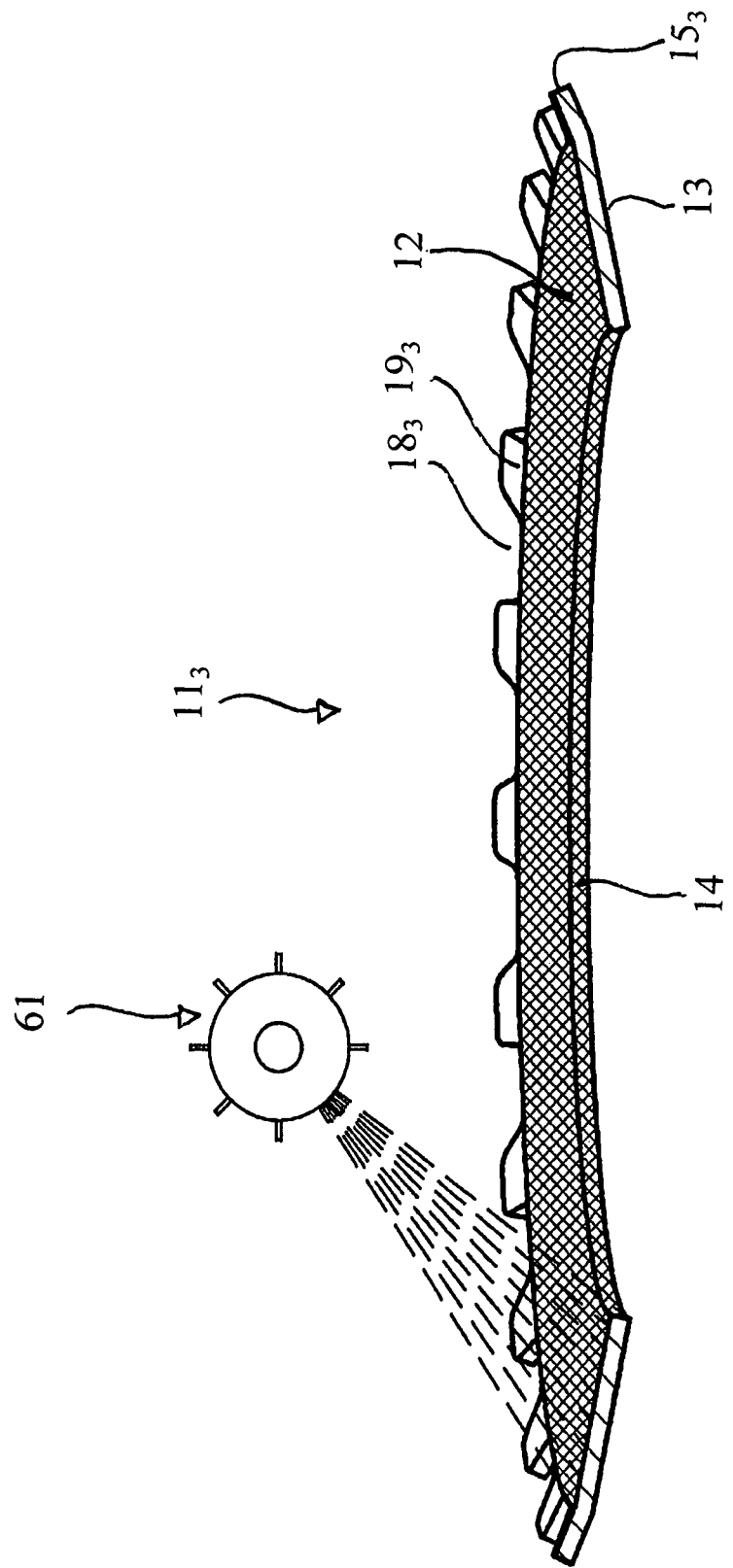
FIG. 25 illustrates an eighth embodiment of an inventive plate spring of a third type during compression by shot peening.

FIG. 25 shows a plate spring $11_3$, basically, in the same illustration as in FIGS. 1 to 5, but the spring $11_3$ is slotted on the outside, so that there exists only a smooth continuous inner annular edge 14 whereas the outer annular edge $15_3$ is defined by trapezoidal slots $18_3$ and tabs $19_3$. Shot peening compression under tensile stress does not affect the tabs $19_3$. Instead the underside 12 and the inner annular edge 14 of the plate spring $11_3$ are subjected to shot peening enter tensile stress.

Figure 26:
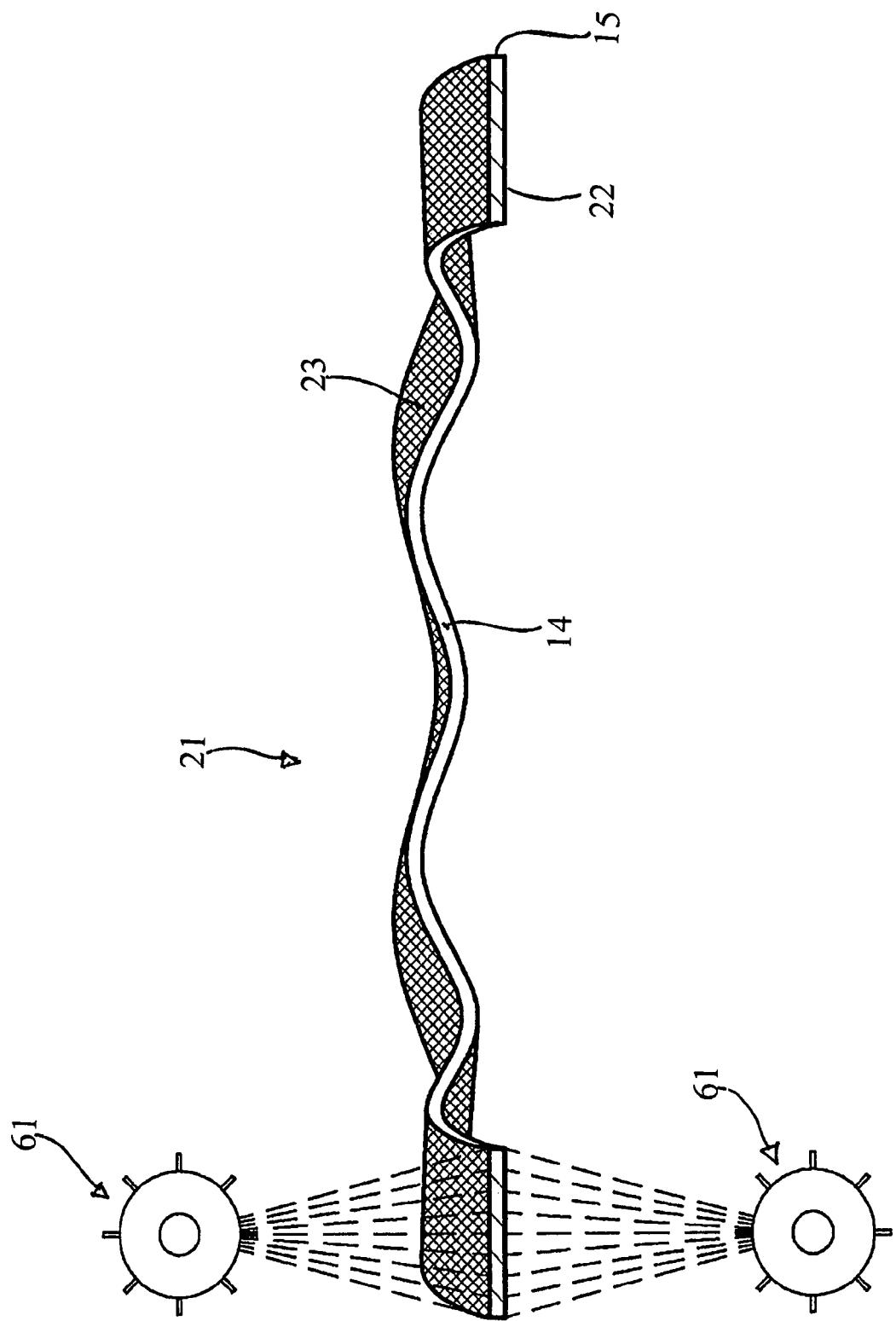
FIG. 26 illustrates a first embodiment of an inventive undulating spring of a first type during compression by shot peening.
Figure 27:
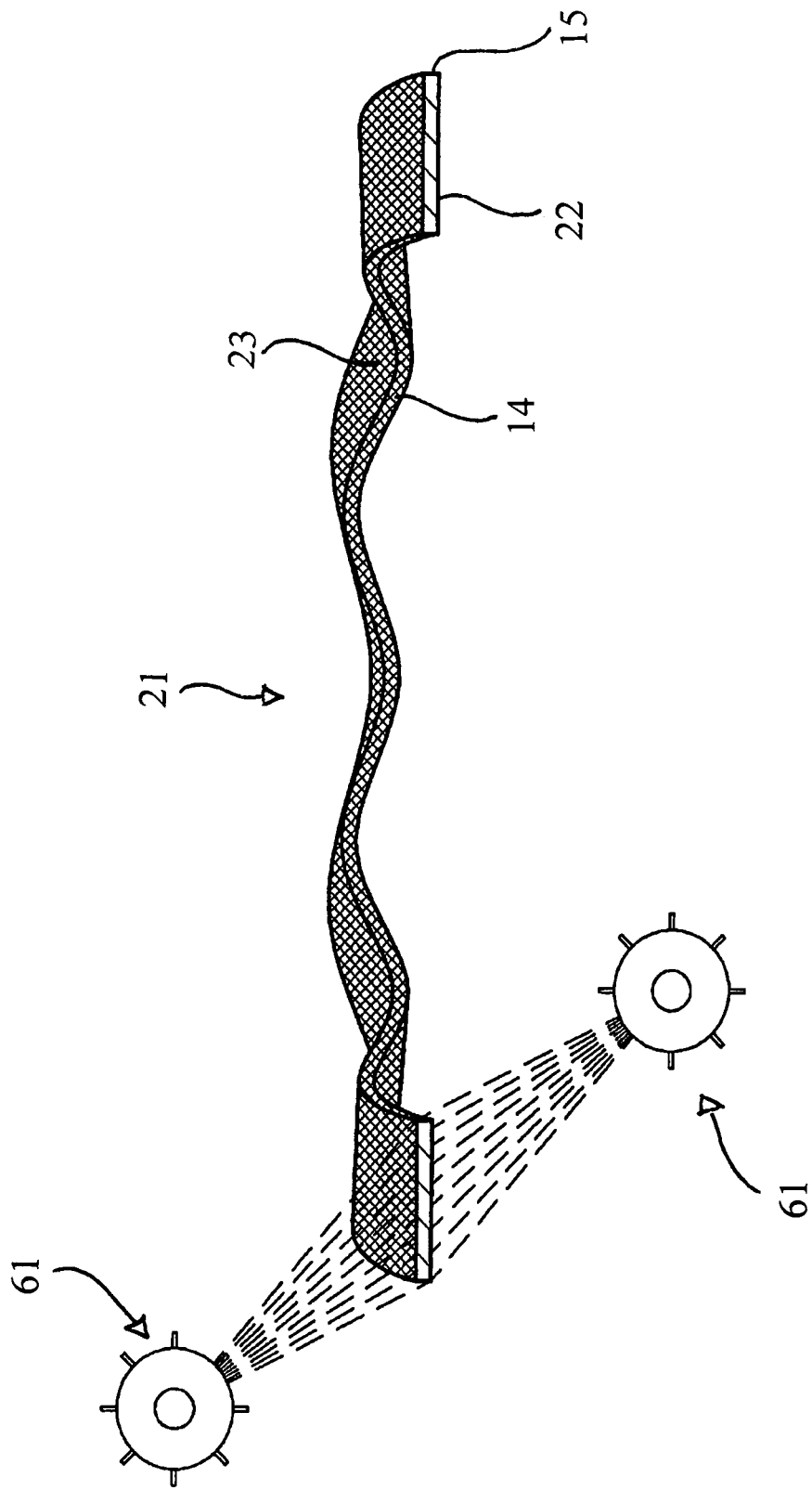
FIG. 27 illustrates a second embodiment of an inventive undulating spring during compression by shot peening.
Figure 28:
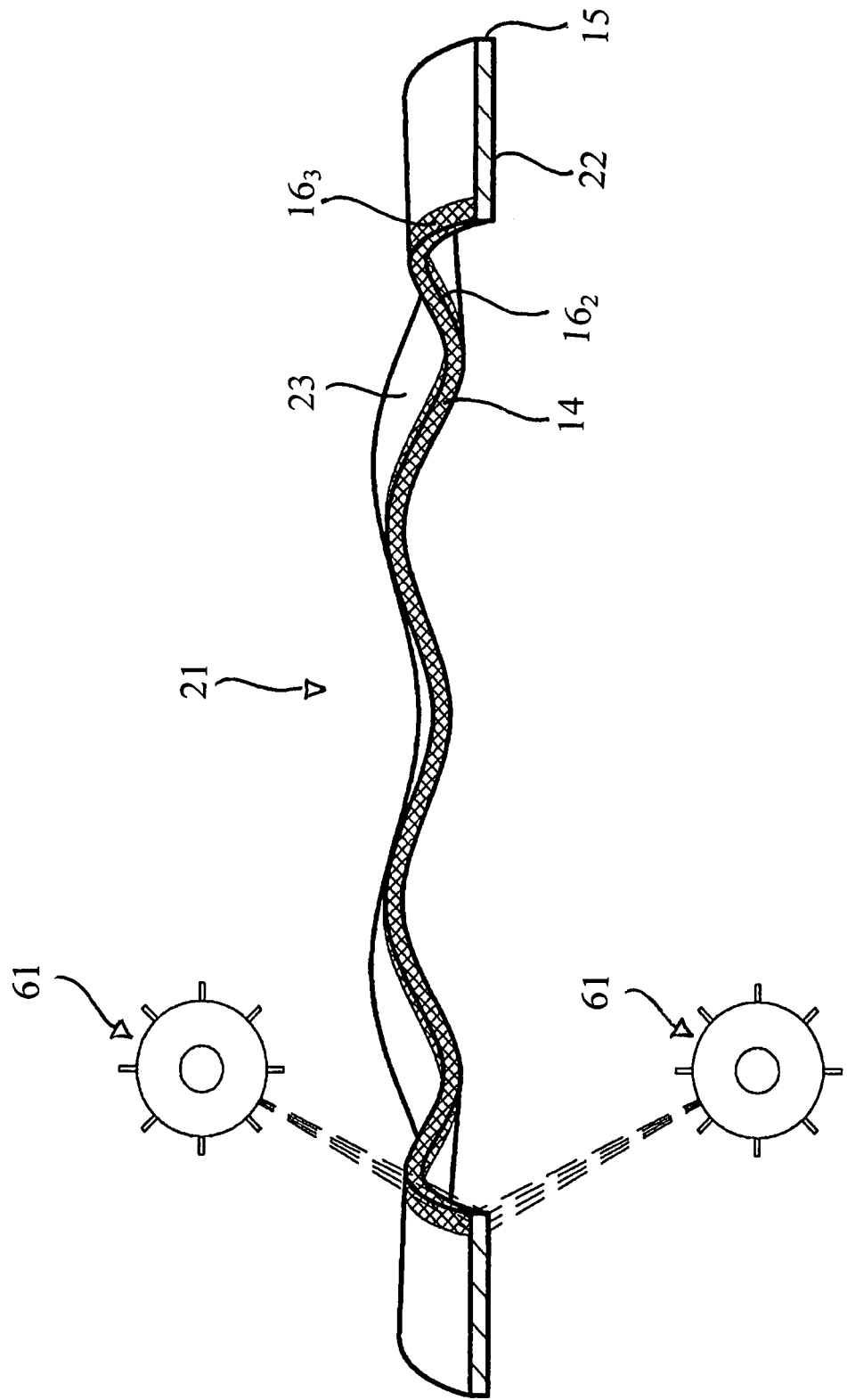
FIG. 28 illustrates a third embodiment of an inventive undulating spring during compression by shot peening.

FIGS. 26 to 28 will first be described jointly. They each show an undulating spring 21 in a 3D illustration of which a front partial region has been cut away. The undulating spring, as a whole, constitutes a compete annulus. In accordance with its definition, the circumference of the undulating spring is undulating and, as illustrated, can comprise upper and lower sides which extend parallel relative to one another. As far as details are concerned, there are shown an underside 22, an upper side 23, an inner annular edge 14 and an outer annular edge 15. In a cross-sectional view, the undulating spring is rectangular, i.e. it consists of sheet metal with a substantially uniform thickness. In one embodiment, there is no conicity in the undulating spring 21, but it can be added to the undulation as an additional design criterion. The shot peening device 31 is clamped into a tool holding device (not shown) which is numerically controlled and, more particularly, is movable around three axes. By means not illustrated, the undulating spring 21 can be clamped on and rotatingly driven around its axis, with the device 61 being moved forward across the surfaces of the plate spring. In the process, there is generated a pressure pulse in the surfaces, which pressure pulse plastically deforms the surfaces and, at the same time, generates an internal compressive stress in the boundary layer. The surfaces subjected to shot peening are shown in a dark shade in the Figures, and for clarification purposes, the device 61 is shown in a position on the treated surfaces. To be able to differentiate between the upper side and the underside, the spring is shown in the stress-relieved condition, whereas shot peening actually takes place on the pretensioned, more particularly flat-pressed undulating spring.

In FIG. 26, the underside 22 and the upper side 23 are subjected to shot peening under tensile stress.

In FIG. 27, the underside 22, the upper side 23 and the inner and outer annular edges 14, 15 are subjected to shot peening compression under tensile stress.

In FIG. 28, the inner edge 14 and two delimited boundary regions $16_2$, $16_3$ adjoining the inner edge 14 on the underside 22 and of the upper side 23 are subjected to shot peening under tensile stress.

Figure 29:
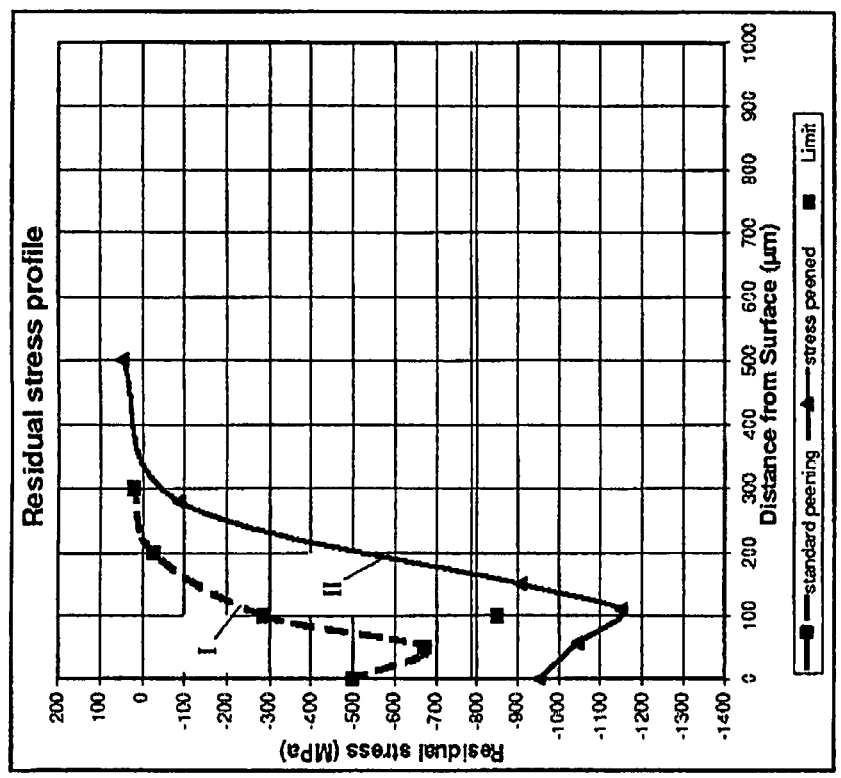
FIG. 29 illustrates the stress curve in the boundary layer of a plate spring or undulating spring pretensioned and shot-peened in accordance with the invention as compared to the stress curve in the boundary layer of a conventionally shot-peened plate spring or undulating spring.

FIG. 29 shows the stress curve in the boundary layer of an inventive surface region treated by shot peening in MPa as a function of the distance from the surface in µm as compared to the stress curve in the boundary layer of a plate spring or undulating spring in accordance with the state of the art, with the upper curve I showing the result of a process according to the state of the art after the plate spring or undulating spring has been shot-peened, with the spring being in the stress-relieved condition, and the lower curve II shows the result of an inventive process after shot peening, with the plate spring or undulating spring having been clamped in, i.e. with the spring, in this case, having been pressed into the planar condition. The internal compressive stress values of the lower curve II expressed in negative terms are clearly higher than, and extend deeper into the boundary layer than, in the case of curve I after a conventional shot peening process.

We claim:

1. A process of producing a plate spring or an undulating spring having a closed annular shape comprising the steps of:
   providing a plate spring or an undulating spring having a closed annular shape and including surface regions that are subjected to tensile stresses when the plate spring or the undulating spring is under load;
   shot peening a total surface of the plate spring or the undulating spring; and
   rollingly compressing an annular partial surface region of the shot peened total surface of the plate spring or the undulating spring such that an internal compressive stress is generated in a boundary layer of the annular partial surface region, wherein the annular partial surface region is rollingly compressed by bringing a ball or a roller into pressure contact with the plate spring or the undulating spring and by rotating the plate spring or the undulating spring around an axis relative to the ball or roller.

2. A process according to claim 1, wherein said layer regions are rollingly compressed in circular movements of the ball or roller around the axis of the spring, relative to the spring.

3. A process according to claim 1, wherein said surface regions are rollingly compressed while tensile stresses are forced on to said surface regions.

4. A process according to claim 1, wherein the rolling compression takes place at an increased temperature of the spring of at least 180°.

5. A process according to claim 1, wherein the total surface of the spring is compressed by shot peening and that partial surfaces of the spring are compressed by rolling compression.

6. A process according to claim 3, wherein said surface regions are compressed rollingly or by shot peening, with the spring being at least elastically deformed, more particularly pressed into a flat condition.

7. A process according to claim 1, wherein said rolling compression takes place after the spring has been quenched and tempered.

* * * * *